US012645959B2

(12) United States Patent (10) Patent No.: US 12,645,959 B2
Le et al. (45) Date of Patent: Jun. 2, 2026

(54) INSTANTIATING MACHINE-LEARNING MODELS AT ON-DEMAND CLOUD-BASED SYSTEMS WITH USER-DEFINED DATASETS

(71) Applicant: Adobe Inc., San Jose, CA (US)

(72) Inventors: Nham Van Le, Waterloo (CA); Tuan Manh Lai, San Jose, CA (US); Trung Bui, San Jose, CA (US); Doo Soon Kim, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1026 days.

(21) Appl. No.: 17/331,131

(22) Filed: May 26, 2021

(65) Prior Publication Data

US 2022/0383150 A1 Dec. 1, 2022

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC .................................. G06N 20/00; G06N 5/04
See application file for complete search history.

(56) References Cited

U.S. PATENT DOCUMENTS

| | | | | |
|---|---|---|---|---|
| 10,938,637 | B2 * | 3/2021 | Narang ................... | H04L 41/16 |
| 10,956,790 | B1 * | 3/2021 | Victoroff .............. | G06F 3/0481 |
| 11,526,385 | B1 * | 12/2022 | Mannar ................... | G06F 9/542 |
| 11,868,436 | B1 * | 1/2024 | Gokalp ................... | G06N 20/20 |
| 2016/0232457 | A1 * | 8/2016 | Gray ....................... | G06F 16/26 |
| 2020/0082272 | A1 * | 3/2020 | Gu ....................... | G06N 3/0499 |

(Continued)

OTHER PUBLICATIONS

Alan Akbik, Tanja Bergmann, Duncan Blythe, Kashif Rasul, Stefan Schweter, and Roland Vollgraf. 2019. FLAIR: An easy-to-use framework for state-of-the-art NLP. In Proceedings of the 2019 Conference of the North American Chapter of the Association for Computational Linguistics (Demonstrations), pp. 54-59, Minneapolis, Minnesota. Association for Computational Linguistics.

(Continued)

*Primary Examiner* — Omar F Fernandez Rivas
*Assistant Examiner* — Corey M Sackalosky
(74) *Attorney, Agent, or Firm* — Keller Preece PLLC

(57) ABSTRACT

This disclosure describes methods, non-transitory computer readable storage media, and systems that provide a platform for on-demand selection of machine-learning models and on-demand learning of parameters for the selected machine-learning models via cloud-based systems. For instance, the disclosed system receives a request indicating a selection of a machine-learning model to perform a machine-learning task (e.g., a natural language task) utilizing a specific dataset (e.g., a user-defined dataset). The disclosed system utilizes a scheduler to monitor available computing devices on cloud-based storage systems for instantiating the selected machine-learning model. Using the indicated dataset at a determined cloud-based computing device, the disclosed system automatically trains the machine-learning model. In additional embodiments, the disclosed system generates a dataset visualization, such as an interactive confusion matrix, for interactively viewing and selecting data generated by the machine-learning model.

20 Claims, 16 Drawing Sheets

(56) References Cited

U.S. PATENT DOCUMENTS

| 2020/0218719 A1* | 7/2020 | Eifert | G06F 16/35 |
| 2020/0250012 A1* | 8/2020 | Nikam | G06F 9/5088 |
| 2021/0192126 A1* | 6/2021 | Gehrmann | G06N 3/09 |

OTHER PUBLICATIONS

Rabah Alzaidy, Cornelia Caragea, and C Lee Giles. 2019. Bi-lstm-crf sequence labeling for keyphrase extraction from scholarly documents. In The world wide web conference, pp. 2551-2557.

Isabelle Augenstein, Mrinal Das, Sebastian Riedel, Lakshmi Vikraman, and Andrew McCallum. 2017. Semeval 2017 task 10: Scienceie—extracting keyphrases and relations from scientific publications. CoRR, abs/1704.02853.

Iz Beltagy, Kyle Lo, and Arman Cohan. 2019. Scibert: A pretrained language model for scientific text. In EMNLP/IJCNLP.

Tom Bocklisch, Joey Faulkner, Nick Pawlowski, and Alan Nichol. 2017. Rasa: Open source language understanding and dialogue management. ArXiv, abs/1712.05181.

Jacqueline Brixey, Ramesh Manuvinakurike, Nham Le, Tuan Lai, Walter Chang, and Trung Bui. 2018. A system for automated image editing from natural language commands. arXiv preprint arXiv:1812.01083.

Qian Chen, Zhu Zhuo, and Wen Wang. 2019. Bert for joint intent classification and slot filling. ArXiv, abs/1902.10909.

Soheil Danesh, Tamara Sumner, and James H. Martin. 2015. Sgrank: Combining statistical and graphical methods to improve the state of the art in unsupervised keyphrase extraction. In *SEM@NAACL-HLT.

Jacob Devlin, Ming-Wei Chang, Kenton Lee, and Kristina Toutanova. 2018. BERT: pre-training of deep bidirectional transformers for language understanding. CoRR, abs/1810.04805.

Thomas Elsken, Jan Hendrik Metzen, and Frank Hutter. 2019. Neural architecture search: A survey. ArXiv, abs/1808.05377.

Ming Gong, Linjun Shou, Wutao Lin, Zhijie Sang, Quanjia Yan, Ze Yang, and Daxin Jiang. 2019. Neuronblocks—building your nlp dnn models like playing lego. ArXiv, abs/1904.09535.

Charles T. Hemphill, John J. Godfrey, and George R. Doddington. 1990. The ATIS spoken language systems pilot corpus. In Speech and Natural Language: Proceedings of a Workshop Held at Hidden Valley, Pennsylvania, Jun. 24-27, 1990.

Zhiheng Huang, Wei Xu, and Kai Yu. 2015. Bidirectional lstm-crf models for sequence tagging. arXiv preprint arXiv:1508.01991.

Anette Hulth. 2003. Improved automatic keyword extraction given more linguistic knowledge. In EMNLP.

Yufan Jiang, Chi Hu, Tong Xiao, Chunliang Zhang, and Jingbo Zhu. 2019. Improved differentiable architecture search for language modeling and named entity recognition. In EMNLP/ICJNLP.

Nikita Klyuchnikov, Ilya Trofimov, Ekaterina Artemova, Mikhail Salnikov, Maxim Fedorov, and Evgeny Burnaev. 2020. Nas-bench-nlp: Neural architecture search benchmark for natural language processing. arXiv preprint arXiv:2006.07116.

Tuan Lai, Trung Bui, Nedim Lipka, and Sheng Li. 2018a. Supervised transfer learning for product information question answering. In 2018 17th IEEE International Conference on Machine Learning and Applications (ICMLA), pp. 1109-1114. IEEE.

Tuan Manh Lai, Trung Bui, and Sheng Li. 2018b. A review on deep learning techniques applied to answer selection. In Proceedings of the 27th International Conference on Computational Linguistics, pp. 2132-2144, Santa Fe, New Mexico, USA. Association for Computational Linguistics.

Tuan Manh Lai, Quan Hung Tran, Trung Bui, and Daisuke Kihara. 2020. A simple but effective bert model for dialog state tracking on resource-limited systems. In ICASSP 2020-2020 IEEE International Conference on Acoustics, Speech and Signal Processing (ICASSP), pp. 8034-8038. IEEE.

Ying Lin, Liyuan Liu, Heng Ji, Dong Yu, and Jiawei Han. 2019. Reliability-aware dynamic feature composition for name tagging. In Proceedings of the 57th Annual Meeting of the Association for Computational Linguistics, pp. 165-174, Florence, Italy. Association for Computational Linguistics.

Ramesh Manuvinakurike, Jacqueline Brixey, Trung Bui, Walter Chang, Doo Soon Kim, Ron Artstein, and Kallirroi Georgila. 2018. Edit me: A corpus and a framework for understanding natural language image editing. In Proceedings of the Eleventh International Conference on Language Resources and Evaluation (LREC 2018), Miyazaki, Japan. European Language Resources Association (ELRA).

Rada Mihalcea and Paul Tarau. 2004. Textrank: Bringing order into text. In EMNLP.

Peng Qi, Yuhao Zhang, Yuhui Zhang, Jason Bolton, and Christopher D. Manning. 2020. Stanza: A python natural language processing toolkit for many human languages. In ACL.

Dhruva Sahrawat, Debanjan Mahata, Haimin Zhang, Mayank Kulkarni, Agniv Sharma, Rakesh Gosangi, Amanda Stent, Yaman Kumar, Rajiv Ratn Shah, and Roger Zimmermann. 2020. Keyphrase extraction as sequence labeling using contextualized embeddings. In European Conference on Information Retrieval, pp. 328-335. Springer.

Minjoon Seo, Aniruddha Kembhavi, Ali Farhadi, and Hannaneh Hajishirzi. 2017. Bidirectional attention flow for machine comprehension. ArXiv, abs/1611.01603.

Xiaojun Wan and Jianguo Xiao. 2008. Single doc- ument keyphrase extraction using neighborhood knowledge. In AAAl.

Yu Wang, Yilin Shen, and Hongxia Jin. 2018. A bimodel based RNN semantic frame parsing model for intent detection and slot filling. In Proceedings of the 2018 Conference of the North American Chapter of the Association for Computational Linguistics: Human Language Technologies, vol. 2 (Short Papers), pp. 309-314, New Orleans, Louisiana. Association for Computational Linguistics.

Ian H Witten, Gordon W Paynter, Eibe Frank, Carl Gutwin, and Craig G Nevill-Manning. 2005. Kea: Practical automated keyphrase extraction. In Design and Usability of Digital Libraries: Case Studies in the Asia Pacific, pp. 129-152. IGI global.

Xiaodong Zhang and Houfeng Wang. 2016. A joint model of intent determination and slot filling for spoken language understanding. In Proceedings of the Twenty-Fifth International Joint Conference on Artificial Intelligence, IJCAI'16, p. 2993-2999. AAAI Press.

Qi Zhu, Zheng Zhang, Yan Fang, Xiang Li, Ryuichi Takanobu, Jin chao Li, Baolin Peng, Jianfeng Gao, Xiao-Yan Zhu, and Minlie Huang. 2020. Convlab-2: An open-source toolkit for building, evaluating, and diagnosing dialogue systems. ArXiv, abs/2002.04793.

* cited by examiner

*Fig. 2*

Figure 4H:
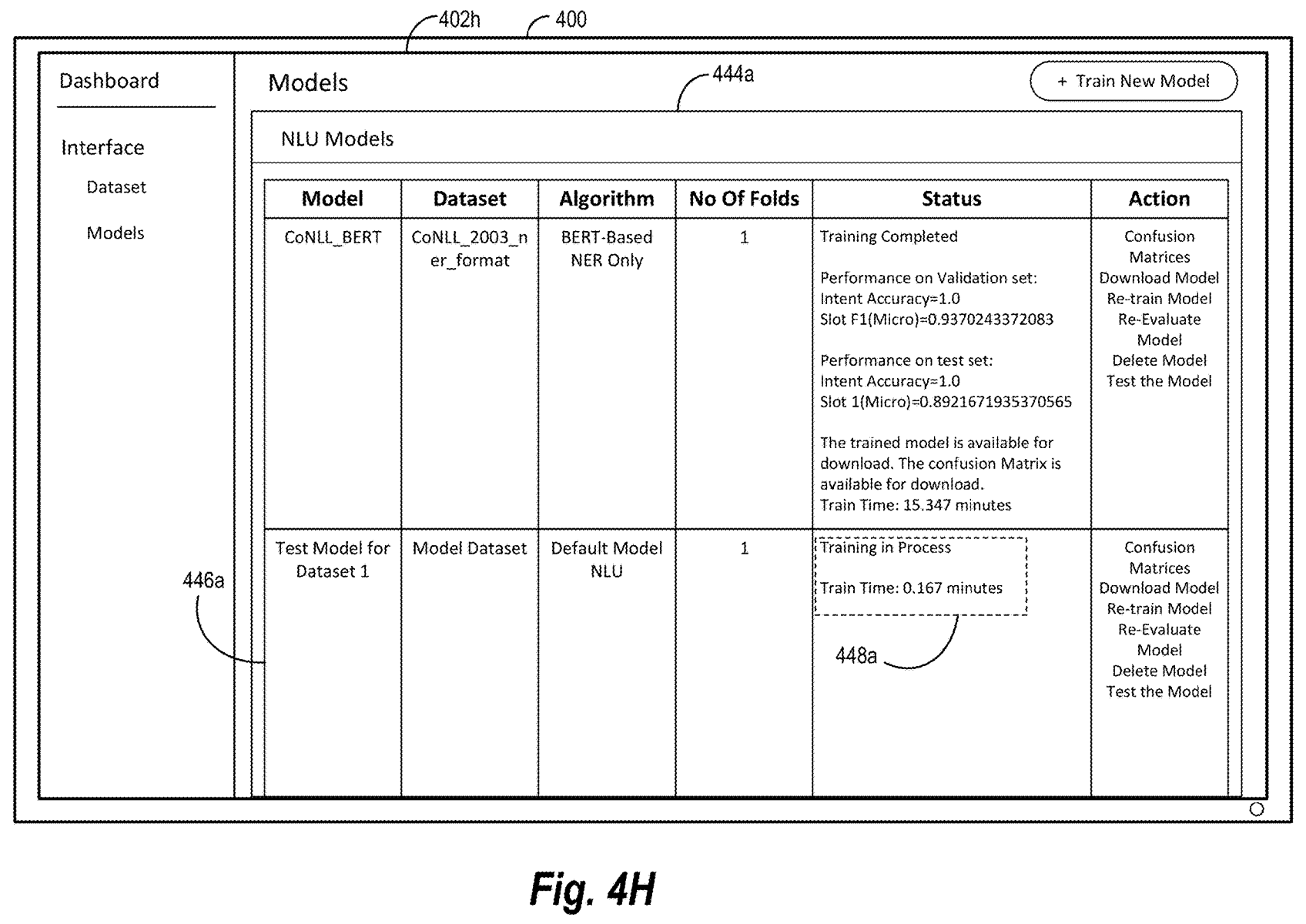

| Dashboard | Models | | | | | + Train New Model |

Interface

Dataset

Models

NLU Models

| Model | Dataset | Algorithm | No Of Folds | Status | Action |
|-------|---------|-----------|-------------|--------|--------|
| CoNLL_BERT | CoNLL_2003_n er_format | BERT-Based NER Only | 1 | Training Completed<br><br>Performance on Validation set:<br>Intent Accuracy=1.0<br>Slot F1(Micro)=0.9370243372083<br><br>Performance on test set:<br>Intent Accuracy=1.0<br>Slot 1(Micro)=0.89216719353705 65<br><br>The trained model is available for download. The confusion Matrix is available for download.<br>Train Time: 15.347 minutes | Confusion Matrices<br>Download Model<br>Re-train Model<br>Re-Evaluate Model<br>Delete Model<br>Test the Model |
| Test Model for Dataset 1 | Model Dataset | Default Model NLU | 1 | Training in Process<br><br>Train Time: 0.167 minutes | Confusion Matrices<br>Download Model<br>Re-train Model<br>Re-Evaluate Model<br>Delete Model<br>Test the Model |

Figure 4I:
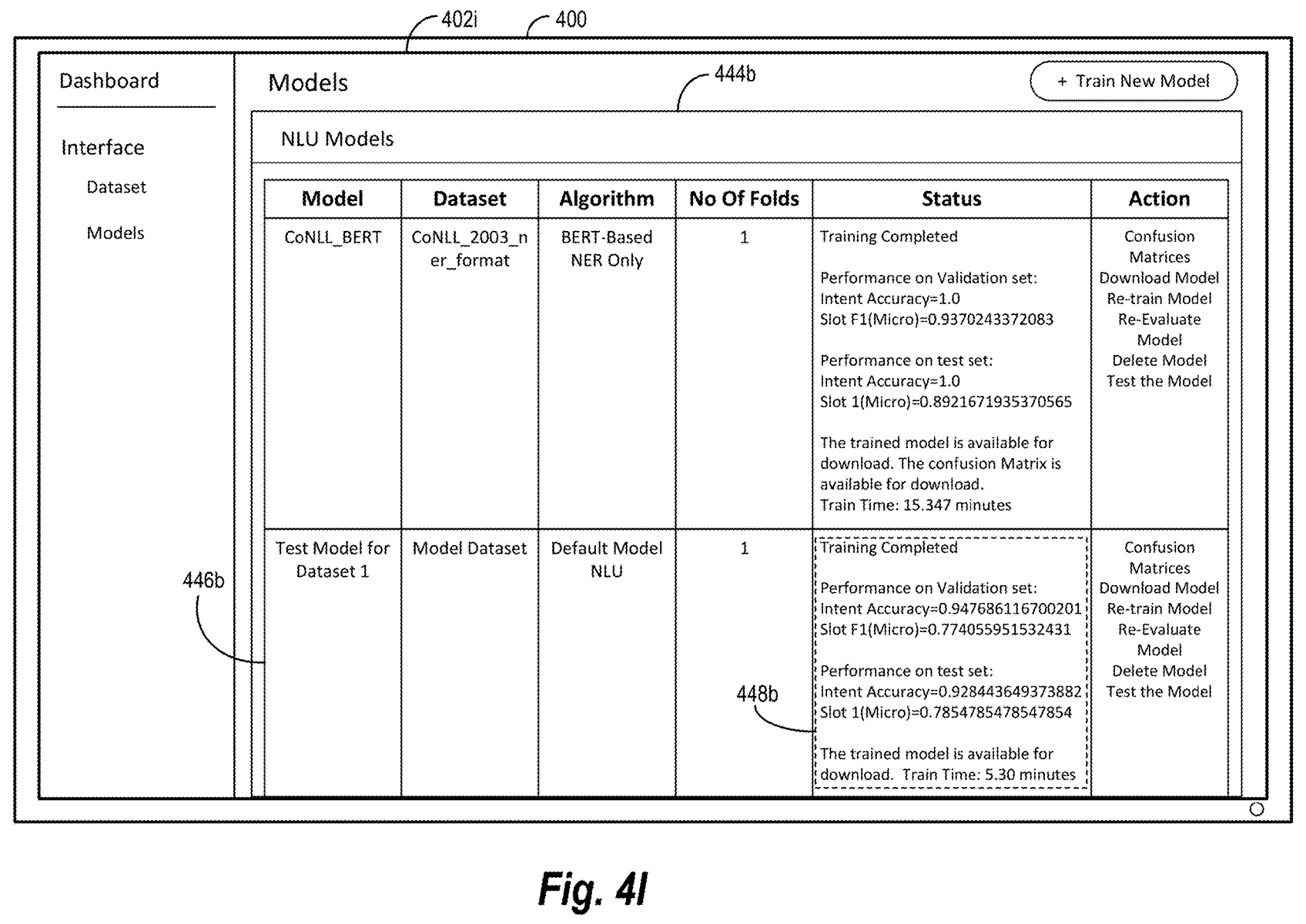

| Dashboard | Models | | | | | + Train New Model |
|---|---|---|---|---|---|---|

Interface

Dataset

Models

NLU Models

| Model | Dataset | Algorithm | No Of Folds | Status | Action |
|---|---|---|---|---|---|
| CoNLL_BERT | CoNLL_2003_n er_format | BERT-Based NER Only | 1 | Training Completed<br><br>Performance on Validation set:<br>Intent Accuracy=1.0<br>Slot F1(Micro)=0.93702433720083<br><br>Performance on test set:<br>Intent Accuracy=1.0<br>Slot 1(Micro)=0.892167193537 0565<br><br>The trained model is available for download. The confusion Matrix is available for download.<br>Train Time: 15.347 minutes | Confusion Matrices<br>Download Model<br>Re-train Model<br>Re-Evaluate Model<br>Delete Model<br>Test the Model |
| Test Model for Dataset 1 | Model Dataset | Default Model NLU | 1 | Training Completed<br><br>Performance on Validation set:<br>Intent Accuracy=0.94768611670 0201<br>Slot F1(Micro)=0.7740595951532431<br><br>Performance on test set:<br>Intent Accuracy=0.9284436493 73882<br>Slot 1(Micro)=0.78547854785 47854<br><br>The trained model is available for download. Train Time: 5.30 minutes | Confusion Matrices<br>Download Model<br>Re-train Model<br>Re-Evaluate Model<br>Delete Model<br>Test the Model |

```
                                                                          602
┌──────────────────────────────────────────────────────────────┐
│     Receiving A Request To Instantiate A Selected Machine-Learning Model     │
└──────────────────────────────────────────────────────────────┘
                              │
                              ▼
                                                                          604
┌──────────────────────────────────────────────────────────────┐
│              Determining A Cloud-Based Computing Device                 │
│  ┌────────────────────────────────────────────────────────┐  │  604a
│  │        Monitoring A Status Of An On-Demand Cluster        │  │
│  └────────────────────────────────────────────────────────┘  │
│  ┌────────────────────────────────────────────────────────┐  │  604b
│  │   Determining That The Cloud-Based Computing Device Is Available   │  │
│  └────────────────────────────────────────────────────────┘  │
└──────────────────────────────────────────────────────────────┘
                              │
                              ▼
                                                                          606
┌──────────────────────────────────────────────────────────────┐
│             Instantiating The Selected Machine-Learning Model          │
└──────────────────────────────────────────────────────────────┘
                              │
                              ▼
                                                                          608
┌──────────────────────────────────────────────────────────────┐
│  Generating A Dataset Visualization With Interactive Data For The Dataset  │
│  ┌────────────────────────────────────────────────────────┐  │  608a
│  │  Generating Classifications For The Dataset Using The Selected Machine-  │  │
│  │                     Learning Model                     │  │
│  └────────────────────────────────────────────────────────┘  │
│  ┌────────────────────────────────────────────────────────┐  │  608b
│  │  Generating An Interactive Confusion Matrix Based On The Classifications  │  │
│  └────────────────────────────────────────────────────────┘  │
└──────────────────────────────────────────────────────────────┘
```

*Fig. 6*

INSTANTIATING MACHINE-LEARNING MODELS AT ON-DEMAND CLOUD-BASED SYSTEMS WITH USER-DEFINED DATASETS

BACKGROUND

Technological advances in computing device capabilities have increased the prevalence of machine learning in performing a wide variety of computing tasks. For example, many computing systems utilize machine learning to perform tasks in user interactions with computing devices and in digital content analysis. To illustrate, computing systems often utilize machine learning to process digital content (e.g., digital images, digital text, digital inputs to computing devices) to understand the contents of the digital content with no (or minimal) user intervention. To name a few examples, some computing systems utilize machine learning to perform tasks involving natural language understanding for customer support, question answering, entity recognition, or intention detection.

While technological advances have expanded the variety of tasks available on machine-learning models, existing systems that train machine-learning models for new or adjusted tasks use platforms with rigid and inefficient tools and user interfaces. For example, some existing model training systems automatically select machine-learning models to perform machine-learning tasks while limiting user choice in selecting the model and often require significant re-training for specific datasets. Further, certain existing model training systems train selected models with user-provided data utilizing training algorithms over which the users have little or no control and restrict use to a specific service. Accordingly, the existing systems lack flexibility and efficiency in implementing machine-learning model training and use.

SUMMARY

This disclosure describes one or more embodiments of systems, methods, and non-transitory computer readable storage media that provide benefits and/or solve one or more of the foregoing and other problems in the art. Specifically, the disclosed systems provide a platform for on-demand selection of machine-learning models and on-demand learning of parameters for the selected machine-learning models via cloud-based systems. For instance, the disclosed systems receive a request indicating a selection of a machine-learning model to perform a machine-learning task (e.g., a natural language task) utilizing a specific dataset (e.g., a user-defined dataset). The disclosed systems utilize a scheduler to monitor available computing devices on cloud-based storage systems for instantiating the selected machine-learning model. Using the indicated dataset at a determined cloud-based computing device, the disclosed systems automatically train the selected machine-learning model. In some embodiments, the disclosed systems generate a dataset visualization for interactively viewing and selecting data generated by the machine-learning model. By providing on-demand and cloud-vendor-agnostic use of cloud-based computing devices for user-selected machine-learning models and datasets, the disclosed system improves the efficiency and accuracy of computing systems that learn parameters for machine-learning models.

BRIEF DESCRIPTION OF THE DRAWINGS

The detailed description refers to the drawings briefly described below.

FIG. 2 illustrates an overview diagram of the on-demand model instantiation system instantiating a requested machine-learning model for a requested dataset in accordance with one or more implementations.

FIGS. 4A-4J illustrate graphical user interfaces for training a machine-learning model based on a user-defined dataset in accordance with one or more implementations.

FIG. 6 illustrates a flowchart of a series of acts for instantiating user-selected machine-learning models at on-demand cloud-based systems with user-defined datasets in accordance with one or more implementations.

DETAILED DESCRIPTION

Figure 1:
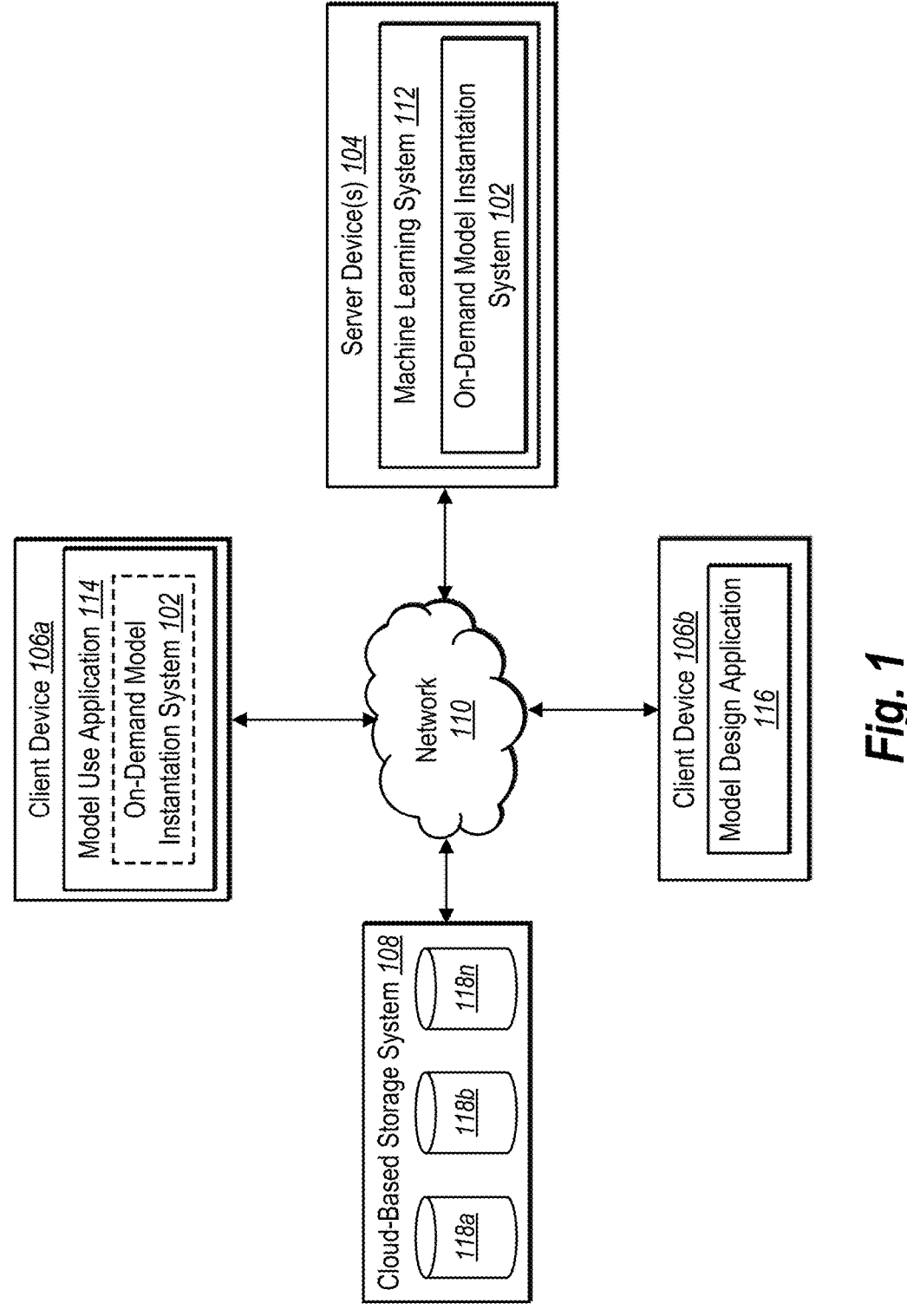
FIG. 1 illustrates a block diagram of a system environment in which an on-demand model instantiation system is implemented in accordance with one or more implementations.

This disclosure describes one or more embodiments of an on-demand model instantiation system that improves computing systems that instantiate and learn parameters for tuning machine-learning models. Specifically, the on-demand model instantiation system utilizes a user-selected machine-learning model and a user-selected dataset to instantiate a machine-learning model for performing a task via a cloud-based storage system. For example, the on-demand model instantiation system selects a cloud-based computing device from one or more cloud-based storage systems (e.g., in a system-agnostic monitoring process) according to availability of the cloud-based computing device and parameters of the machine-learning task. The on-demand model instantiation system then instantiates the selected machine-learning model at the selected cloud-based computing device for training the machine-learning model with the user-selected dataset. In some cases, the on-demand model instantiation system generates an interactive dataset visualization, such as an interactive confusion matrix, for viewing and interacting with the data generated by the machine-learning model according to data samples in the user-selected dataset.

In one or more embodiments, for instance, the on-demand model instantiation system receives a request to instantiate a selected machine-learning model for performing a particular machine-learning task. As part of instantiating the selected machine-learning model, the on-demand model instantiation system determines one or more attributes associated with the machine-learning task and utilizes the attribute(s) to determine a cloud-based computing device corresponding to a cloud-based storage system. The on-demand model instantiation system instantiates the selected machine-learning model at the cloud-based computing device. Additionally, the on-demand model instantiation system learns parameters of the selected machine-learning model at the cloud-based computing device utilizing a dataset selected in connection with the request to instantiate the machine-learning model. In one or more embodiments, the on-demand model instantiation system also generates a dataset visualization with interactive data for the dataset associated with the instantiation of the selected machine-learning model.

As mentioned, in some embodiments, the on-demand model instantiation system receives a request to instantiate a selected machine-learning model. For example, the on-demand model instantiation system receives a selection of a machine-learning model from a plurality of machine-learning models. To illustrate, the on-demand model instantiation system stores on a cloud-based storage system a plurality of machine-learning models (e.g., a plurality of natural language understanding models) or data associated with the plurality of machine-learning models from one or more model designers. In some cases, the on-demand model instantiation system receives a request to instantiate a previously stored machine-learning model. Alternatively, in certain embodiments, the on-demand model instantiation system receives a request to instantiate a new or different machine-learning model not previously stored along with data for the new or different machine-learning model.

In one or more embodiments, a request to instantiate a selected machine-learning model includes information associated with instantiating the machine-learning model based on one or more attributes of a machine-learning task. For instance, the on-demand model instantiation system receives the request via a scheduler to instantiate the selected machine-learning model for a specific time and/or based on the one or more attributes of the machine-learning task. In some embodiments, for example, the one or more attributes of the machine-learning task include a computing hardware configuration for training a machine-learning model to perform or for performing a particular machine-learning task. Such an attribute may include processing power or memory thresholds for training or performing the particular machine-learning task.

In addition to a selected machine-learning model, according to one or more embodiments, the on-demand model instantiation system receives a selection of a dataset in connection with instantiating the selected machine-learning model. Specifically, the on-demand model instantiation system receives a dataset, or an indication of a dataset, selected via a client device. For example, the dataset includes a user-defined dataset including a plurality of data samples provided to the on-demand model instantiation system by the client device or by a computing device associated with the client device. Such a user-defined dataset may include a unique dataset curated or selected by a computing device or an open-source dataset previously used to train the selected machine-learning model.

Based on the selected machine-learning model, in one or more embodiments, the on-demand model instantiation system determines a cloud-based computing device for performing a machine-learning task corresponding to the selected machine-learning model. To illustrate, in some cases, the on-demand model instantiation system monitors a status of an on-demand cluster including a plurality of cloud-based computing devices to determine the availability of one or more cloud-based computing devices. More specifically, the on-demand model instantiation system maintains one or more on-demand instances of cloud-based computing device with various computing hardware configurations. The on-demand model instantiation system then selects a cloud-based computing device that is available and includes computing hardware compatible with one or more attributes associated with the machine-learning task.

In connection with determining a cloud-based computing device, in certain implementations, the on-demand model instantiation system instantiates a selected machine-learning model at the selected cloud-based computing device. For example, the on-demand model instantiation system implements the machine-learning model at the cloud-based computing device by storing and running the machine-learning model on the cloud-based computing device. Additionally, the on-demand model instantiation system assigns the machine-learning model to perform a particular machine-learning task, such as a natural language understanding task including processing and classifying a dataset including natural language samples.

After determining a cloud-based computing device and instantiating the selected machine-learning model on the determined device, in one or more embodiments, the on-demand model instantiation system learns parameters of the selected machine-learning model. To illustrate, the on-demand model instantiation system utilizes a selected dataset indicated by a client device to learn parameters of the selected machine-learning model. For example, the on-demand model instantiation system converts a plurality of data samples in the selected dataset to an intermediate representation associated with the on-demand model instantiation system based on annotations in the data samples. The on-demand model instantiation system then learns the parameters of the machine-learning model by classifying the plurality of data samples in the user-defined dataset based on the intermediate representation.

After or as part of the processing of learning parameters, in some embodiments, the on-demand model instantiation system also generates a dataset visualization including interactive data for the dataset. Specifically, the on-demand model instantiation system utilizes the selected machine-learning model to provide a visualization indicating data associated with classifying a plurality of data samples in the dataset. For example, the on-demand model instantiation system generates an interactive confusion matrix based on results of the machine-learning model. To illustrate, the on-demand model instantiation system maps classifications of the data samples to interactive cells in the confusion matrix for displaying the classification data within a graphical user interface of a client device.

While some existing model training systems implement algorithms that guide the training of machine-learning models for tasks, such as natural language understanding or image classification, the existing systems lack flexibility and efficiency. Specifically, many systems utilize or train open-source machine-learning models to perform machine-learning tasks. While open-source models are widely available to the public, implementing open-source models for a specific, user-defined dataset can be cumbersome. For example, such open-source models can require a significant amount of re-training based on the user-defined dataset, if re-training is even possible—which can significantly impact model accuracy for a particular task. Some existing model training systems provide access to open-source models via frameworks that automatically select a machine-learning model for a user (not selected by a user) from a plurality of available models to perform a machine-learning task.

Furthermore, some existing model training systems provide machine-learning models for various tasks while limiting the amount of control model users have over the performance of the model during the task. In particular, the existing systems can select a model based on a particular task indicated by a model user in an end-to-end solution. For instance, the existing systems provide an interface to make one or more calls to a selected model along with user-provided data. The existing systems then train the data utilizing training algorithms over which the user has no control, such that the users are unable to easily verify the performance of the model or the accuracy of the dataset. Because these existing systems provide limited control over the training/implementation of a model, the existing systems also typically restrict the implementation of the model to a particular service (e.g., a specific cloud-based system). Additionally, by limiting the control model users have over the implementation of the models, the existing systems can also expose the provided data to potential risks.

The disclosed on-demand model instantiation system can provide a number of technical advantages over conventional model training systems. For example, the on-demand model instantiation system can improve flexibility, efficiency, and accuracy relative to existing systems that implement machine-learning models. In contrast to the previously mentioned existing systems that automatically select machine-learning models for performing a particular machine-learning task, the on-demand model instantiation system includes tools for a client device to select a particular machine-learning model and to identify cloud-based computing resources on which to instantiate (and learn parameters for) the machine-learning model. By providing tools to select a machine-learning model, the on-demand model instantiation system provides users graphical-user-interface elements to select a machine-learning model that targeted for the particular use-case and access to cloud-based computing devices more suitable for the selected machine-learning model. By determining that a cloud-based computing device is available and compatible for a selected machine-learning model, the on-demand model instantiation system flexibly identifies computing resources connected to a network that can be used extemporaneously to instantiate (and learn parameters for) the selected machine-learning model.

In addition to improving flexibility, the on-demand model instantiation system improves efficiency by instantiating machine-learning models at cloud-based computing devices from a plurality of different cloud-based systems. Specifically, the on-demand model instantiation system utilizes attributes of a particular machine-learning task, such as computing hardware requirements, to select a cloud-based computing device of an on-demand cluster that includes computing devices across a variety of cloud-based systems. In contrast to existing systems that restrict implementation of machine-learning models to a particular cloud-based system, the on-demand model instantiation system utilizes system agnostic instantiation of machine-learning models. The particular cloud-based computing device identified for instantiation is not limited to a single cloud-based computing system and can come from a variety of cloud-based computing systems. Thus, by monitoring the availability status and computing device hardware configurations across the plurality of cloud-based systems, the on-demand model instantiation system quickly and efficiently instantiates machine-learning models without limiting the instantiation to a single cloud-based system. Additionally, by utilizing on-demand model instantiation that quickly and extemporaneously determines an available and hardware-suitable cloud-based computing device for the selected machine-learning model, the on-demand model instantiation system also efficiently identifies and uses computing resources across a network of potential cloud-based computing devices.

The on-demand model instantiation system also improves flexibility of computing systems that instantiate and train machine-learning models. Specifically, the on-demand model instantiation system provides separate and simplified interaction interfaces at different stages of instantiating a machine-learning model. For instance, the on-demand model instantiation system provides different, simplified interfaces and interaction mechanisms for developers of the machine-learning model, for users of the machine-learning model, and for infrastructure maintainers associated with cloud-based storage systems. By simplifying interfaces for each separate type of user, the on-demand model instantiation system provides easier maintenance and implementation at each stage. Additionally, the on-demand model instantiation system provides simplified interaction mechanisms that improve usability for model users with limited technical knowledge (e.g., users that do not have the same level of understanding as model developers).

Furthermore, the on-demand model instantiation system improves accuracy of model training systems. For example, by providing increased control over specific machine-learning models and datasets used to train the machine-learning models, the on-demand model instantiation system provides more accurate model instantiation and training for each use-case. In contrast to existing systems that restrict control over the machine-learning model and use of the machine-learning model, the on-demand model instantiation system provides full control over the selection and training of machine-learning models. The on-demand model instantiation system thus improves accuracy by selecting machine-learning models most appropriate for each task.

The on-demand model instantiation system also improves accuracy of model performance by providing detailed dataset visualizations to improve the accuracy of the user-defined datasets. For instance, by mapping data generated by a machine-learning model to corresponding cells in a confusion matrix (e.g., based on classification of data samples in a dataset), the on-demand model instantiation system provides improved training accuracy. Specifically, the on-demand model instantiation system provides the interactive dataset visualization for easily determining whether errors generated by the machine-learning model are due to errors in a training algorithm or errors in the analyzed dataset. The on-demand model instantiation system also provides more efficient modification of data samples in a dataset via the dataset visualization and dataset interaction interfaces. Furthermore, the on-demand model instantiation system provides more efficient tuning of hyperparameters of the machine-learning model via modifications to the training algorithm or the dataset.

Turning now to the figures, FIG. 1 includes an embodiment of a system environment 100 in which an on-demand model instantiation system 102 operates. In particular, the system environment 100 includes server device(s) 104, client devices (e.g., a first client device 106a and a second client device 106b), and a cloud-based storage system 108 in communication via a network 110. Moreover, as shown, the server device(s) 104 include a machine-learning system 112, which includes the on-demand model instantiation system 102. Additionally, the first client device 106a includes a model use application 114, and the second client device 106b includes a model design application 116. Furthermore, the cloud-based storage system 108 includes a plurality of cloud-based computing devices 118a-118n.

As shown in FIG. 1, the server device(s) 104 includes or hosts the machine-learning system 112. Specifically, the machine-learning system 112 includes, or is part of, one or more systems that perform machine-learning tasks. For example, the machine-learning system 112 utilizes, but is not limited to, classification machine-learning models to perform machine-learning classification of data in a dataset.

To illustrate, the machine-learning system 112 utilizes natural language understanding models that process digital content (e.g., text or audio) or user inputs to various computing devices or applications (e.g., image-editing requests) to understand the digital content/inputs. In one or more embodiments, the machine-learning system 112 utilizes the machine-learning models to perform one or more additional operations in response to processing digital content/user inputs, such as digital image editing of digital content based on natural language inputs. In alternative embodiments, the machine-learning system 112 utilizes machine-learning models to process datasets including digital images, such as in an image or object classification process. In some embodiments, the machine-learning system 112 interacts with one or more additional systems (e.g., a third-party system) to process data from the additional system(s) and/or perform operations in connection with the additional system(s).

In one or more embodiments, the machine-learning system 112 includes the on-demand model instantiation system 102 to instantiate and manage machine-learning models. For example, the machine-learning system 112 utilizes the on-demand model instantiation system 102 to receive one or more machine-learning models from one or more client devices associated with model designers/developers (e.g., the second client device 106b via the model design application 116). To illustrate, the machine-learning system 112 receives a plurality of machine-learning models to store with the on-demand model instantiation system 102 for performing a variety of machine-learning tasks.

In at least some embodiments, a machine-learning model includes a computer representation that can be tuned (e.g., trained) based on inputs to approximate unknown functions. In particular, a machine-learning model utilizes algorithms to learn from, and make predictions on, known data by analyzing the known data to learn to generate outputs that reflect patterns and attributes of the known data. For instance, a machine-learning model can include, but is not limited to, a regression model, a neural network, or a deep learning model. To illustrate, a machine-learning model can include a classification model, such as a classification predictive model, binary classification model, a multi-class classification model, or a multi-label classification model.

In one or more embodiments, the on-demand model instantiation system 102 provides on-demand instantiation of machine-learning models for a variety of machine-learning tasks. For instance, in response to a request to instantiate a selected machine-learning model, the on-demand model instantiation system 102 communicates with the cloud-based storage system 108 to determine a cloud-based computing device. To illustrate, the cloud-based storage system 108 includes the plurality of cloud-based computing devices 118a-118n. In response to a request from the first client device 106a (e.g., via the model use application 114), the on-demand model instantiation system 102 determines a cloud-based computing device (e.g., a first cloud-based computing device 118a) at the cloud-based storage system 108 according to one or more attributes of the particular machine-learning task.

According to one or more embodiments, a machine-learning task includes one or more computing operations that are performed via the use of one or more machine-learning models. Furthermore, one or more attributes of a machine-learning task include requirements for performing the machine-learning task. For example, an attribute of a machine-learning model includes, but is not limited to, computing hardware requirements for running at least one machine-learning model to perform the machine-learning task. To illustrate, the on-demand model instantiation system 102 determines a computing hardware configuration for running the machine-learning task including, but not limited to, a computer processing configuration, a graphics processing configuration, or a computer memory configuration. In some embodiments, the one or more attributes of a machine-learning task include a default computer hardware configuration or a user-defined computer hardware configuration. In additional embodiments, the on-demand model instantiation system 102 also determines that a machine-learning task utilizes a plurality of machine-learning models on a plurality of cloud-based storage devices and can utilize the plurality of cloud-based storage devices to instantiate and train the plurality of machine-learning models.

In one or more embodiments, the cloud-based storage system 108 includes a platform that provides storage to one or more systems or devices accessible via a network connection. For instance, a cloud-based storage system includes a storage platform that provides access to a cloud-based computing device such as a server device. Thus, in some embodiments, the cloud-based storage system 108 provides access to the on-demand model instantiation system 102 for storing data at a cloud-based computing device via the network 110 and performing one or more machine-learning operations on the cloud-based storage device related to a machine-learning task.

Furthermore, in some embodiments, the on-demand model instantiation system 102 communicates with a plurality of cloud-based storage systems to determine a cloud-based computing device to use for a machine-learning task. To illustrate, the on-demand model instantiation system 102 utilizes system-agnostic determination of cloud-based computing devices for instantiating machine-learning models. Accordingly, the on-demand model instantiation system selects computing devices from a plurality of different cloud-based storage systems based on the computing hardware configurations of the computing devices and the particular attributes of a given machine-learning task.

In some embodiments, the on-demand model instantiation system 102 also provides machine-learning models for instantiation at a client device. For instance, the on-demand model instantiation system 102 communicates with the first client device 106a to provide a selected machine-learning model to the first client device 106a. In some embodiments, the first client device 106a also instantiates the machine-learning model locally (e.g., at the first client device 106a or at a device associated with the first client device 106a), rather than at a cloud-based computing device at the cloud-based storage system 108 or another cloud-based storage system. Indeed, as shown in FIG. 1, in certain implementations, the model use application 114 optionally includes the on-demand model instantiation system 102 and performs the same or similar actions or functions (and exhibits the same or similar technical advantages) as those described for the on-demand model instantiation system 102 on the server device(s) 104.

Additionally, in some embodiments, the on-demand model instantiation system 102 receives a dataset or an indication of a dataset from another system from the first client device 106a in connection with a request to instantiation a selected machine-learning model. In particular, a dataset includes a plurality of data samples related to a particular task. For instance, in connection with a natural language understanding task, a dataset includes a plurality of natural language samples (e.g., sentences or phrases). Thus, the on-demand model instantiation system 102 utilizes the dataset indicated by the first client device 106a for processing by the selected machine-learning model. In one or more embodiments, the on-demand model instantiation system 102 also utilizes the indicated dataset to learn parameters of the machine-learning model at the cloud-based computing device of the cloud-based storage system 108.

In one or more embodiments, the server device(s) 104 include a variety of computing devices, including those described below with reference to FIG. 7. For example, the server device(s) 104 includes one or more servers for storing and processing data associated with machine-learning tasks, such as, but not limited to, machine-learning models or datasets. In some embodiments, the server device(s) 104 also include a plurality of computing devices in communication with each other, such as in a distributed storage environment. In some embodiments, the server device(s) 104 include a content server. The server device(s) 104 can also include an application server, a communication server, a web-hosting server, a social networking server, a digital content campaign server, or a digital communication management server.

In addition, as shown in FIG. 1, the system environment 100 includes client devices (e.g., the first client device 106a and the second client device 106b). In one or more embodiments, the client devices include, but are not limited to, a mobile device (e.g., smartphone or tablet), a laptop, a desktop, including those explained below with reference to FIG. 7. Furthermore, although not shown in FIG. 1, the client devices can be operated by a user (e.g., a user included in, or associated with, the system environment 100) to perform a variety of functions. In particular, the first client device 106a or the second client device 106b performs functions such as, but not limited to, accessing, viewing, analyzing, and interacting with machine-learning models or datasets via the model use application 114 or the model design application 116. For instance, the first client device 106a or the second client device 106b performs functions for generating, capturing, or accessing data to provide to the machine-learning system 112 and the on-demand model instantiation system 102 in connection with machine-learning tasks. For example, the first client device 106a or the second client device 106b communicates with the server device(s) 104 via the network 110 to provide machine-learning models, select machine-learning models, indicate datasets, modify datasets, or perform machine-learning tasks. Although FIG. 1 illustrates the system environment 100 with the first client device 106a and the second client device 106b, the system environment 100 can include a different number of client devices.

Additionally, as shown in FIG. 1, the system environment 100 includes the network 110. The network 110 enables communication between components of the system environment 100. In one or more embodiments, the network 110 may include the Internet or World Wide Web. Additionally, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104, the first client device 106a, the second client device 106b, and the cloud-based storage system 108 communicate via the network 110 using one or more communication platforms and technologies suitable for transporting data and/or communication signals, including any known communication technologies, devices, media, and protocols supportive of data communications, examples of which are described with reference to FIG. 7.

Although FIG. 1 illustrates the server device(s) 104, the first client device 106a, the second client device 106b, and the cloud-based storage system 108 communicating via the network 110, in alternative embodiments, the various components of the on-demand model instantiation system 102 communicate and/or interact via other methods (e.g., the server device(s) 104, the first client device 106a, the second client device 106b, and the cloud-based storage system 108 can communicate directly). Furthermore, although FIG. 1 illustrates the on-demand model instantiation system 102 being implemented by a particular component and/or device within the system environment 100, the on-demand model instantiation system 102 can be implemented, in whole or in part, by other computing devices and/or components in the system environment 100 (e.g., the first client device 106a). Additionally, the server device(s) 104, the second client device 106a, and/or the second client device 106b may access data or machine-learning models from a third-party system via the network 110.

Figure 2:
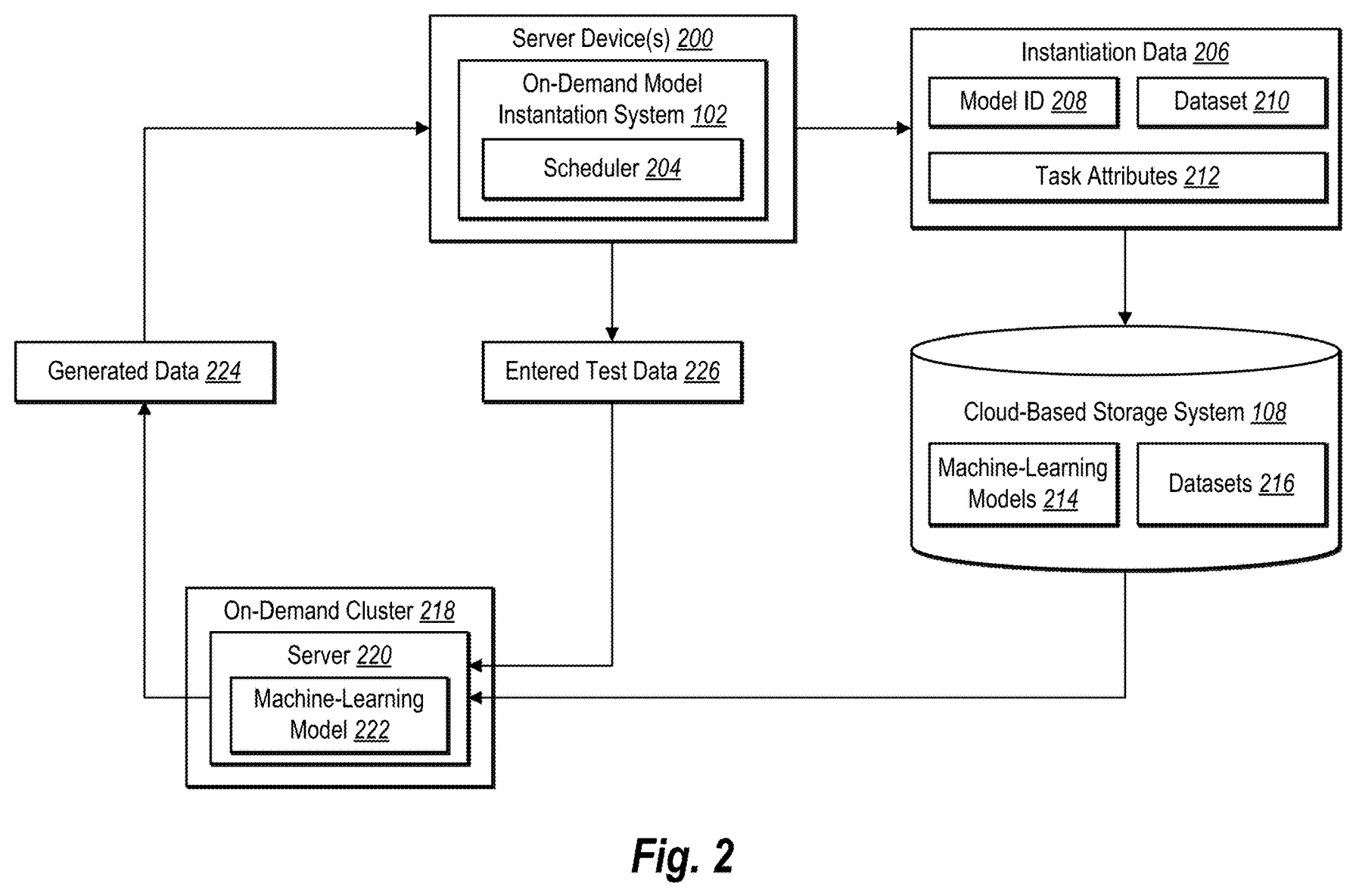

In one or more embodiments, the on-demand model instantiation system 102 flexibly, efficiently, and accurately instantiates machine-learning models at on-demand, system-agnostic cloud-based client devices. FIG. 2 illustrates an overview of the on-demand model instantiation system 102 instantiating a machine-learning model utilizing on-demand scheduling. Specifically, FIG. 2 illustrates that the on-demand model instantiation system 102 utilizes information received in a request from a client device to instantiate a selected machine-learning model at an on-demand cluster of cloud-based computing devices.

In one or more embodiments, as shown in FIG. 2, server device(s) 200 send a request to the on-demand model instantiation system 102 to instantiate a machine-learning model. For example, the server device(s) 200 include the on-demand model instantiation system 102 for sending and receiving information from the on-demand model instantiation system 102 in connection with performing one or more machine-learning tasks. In one or more embodiments, the on-demand model instantiation system 102 includes a web-based application that the on-demand model instantiation system provides for display within a web browser on a client device (e.g., the client device 106a of FIG. 1). In other embodiments, the on-demand model instantiation system 102 communicates with the client device via a standalone application running on the client device.

As further illustrated in FIG. 2, the on-demand model instantiation system 102 includes a scheduler 204 for instantiating a machine-learning model. For example, the scheduler 204 includes a computing software component on the server device(s) 200 that communicates with the client device to instantiate a machine-learning model by obtaining information associated with instantiating the machine-learning model from the client device. While FIG. 2 illustrates the scheduler 204 on the server device(s) 200, in some embodiments, the scheduler 204 resides on a client device (e.g., the client device 106a of FIG. 1) hosting at least a portion of the on-demand model instantiation system 102.

As shown in FIG. 2, the on-demand model instantiation system 102 provides instantiation data 206 for instantiating a machine-learning model to a cloud-based storage system 108. For example, the scheduler 204 can cause the server device(s) 200 to send the instantiation data 206 to the cloud-based storage system 108. In one or more embodiments, the on-demand model instantiation system 102 provides a model identifier ("model ID 208"), a dataset 210, and task attributes 212 to the cloud-based storage system 108.

To illustrate, the on-demand model instantiation system 102 provides the model ID 208 to indicate a selected machine-learning model to the cloud-based storage system 108. For instance, the model ID 208 includes a unique identifier that the cloud-based storage system 108 utilizes to determine a specific machine-learning model. To illustrate, the cloud-based storage system utilizes the model ID 208 to select the machine-learning model from a plurality of machine-learning models 214 that the on-demand model instantiation system 102 stores or to which the cloud-based storage system 102 otherwise has access (e.g., from the on-demand model instantiation system 102). In at least some embodiments, the machine-learning models 214 include pre-trained models for a variety of machine-learning tasks.

In some embodiments, as mentioned, the instantiation data 206 includes the dataset 210. In particular, the dataset 210 includes one or more data samples associated with a machine-learning task. For example, the dataset 210 includes a plurality of natural language samples corresponding to a particular machine-learning task. To illustrate, the dataset 210 includes natural language samples including commands for performing a plurality of operations within a digital image editing application. In one or more additional embodiments, the dataset 210 includes a plurality of data samples related to a machine-learning task, such as classification, clustering, regression, or other task for processing digital text, digital audio, digital images, or digital video. In some embodiments, the cloud-based storage system 108 stores the dataset 210 with a plurality of datasets 216 that the cloud-based storage system 108 stores for use in performing a plurality of different machine-learning tasks for a plurality of different client devices.

As suggested above, in one or more embodiments, the on-demand model instantiation system 102 (e.g., at the cloud-based storage system 108) converts the dataset 210 to an intermediate representation in connection with instantiating a machine-learning model. In particular, the on-demand model instantiation system 102 receives a request from a client device to convert the dataset 210 from an initial representation corresponding to the intermediate representation. For example, the on-demand model instantiation system 102 provides a converter to the client device (e.g., a software component via the client application). The client device utilizes the converter (e.g., by generating a script) to convert the dataset 210 to the intermediate representation to send to the on-demand model instantiation system 102 for storing with the datasets 216 at the cloud-based storage system 108. In some embodiments, the on-demand model instantiation system 102 also provides the converter for converting a dataset from the intermediate format back into another format.

As also illustrated in FIG. 2, the instantiation data 206 also includes task attributes 212 associated with a machine-learning task. For instance, the task attributes 212 include an indication of a computer hardware configuration for performing the machine-learning task utilizing the selected machine-learning model. In one or more embodiments, the on-demand model instantiation system 102 provides the task attributes 212 to the cloud-based storage system 108 to indicate the specific computing hardware configuration. In alternative embodiments, the task attributes 212 include an indication of the machine-learning task, such as a description of the machine-learning task (e.g., a natural language understanding task for digital image editing). The on-demand model instantiation system 102 also determines the computing hardware requirements associated with the machine-learning task based on the description of the machine-learning task and the selected machine-learning model and provides the computing hardware requirements to the cloud-based storage system 108.

In one or more embodiments, after the on-demand model instantiation system 102 provides the instantiation data 206 to the cloud-based storage system 108, the on-demand model instantiation system 102 determines a particular machine-learning model to instantiate. Additionally, the on-demand model instantiation system 102 determines a dataset to use in connection with instantiating the machine-learning model (e.g., for learning parameters of the machine-learning model). As illustrated by FIG. 2, the on-demand model instantiation system 102 utilizes the scheduler 204 to determine a cloud-based computing device at an on-demand cluster 218. In particular, the on-demand model instantiation system 102 utilizes the instantiation data 206 to determine a server 220 for instantiating a machine-learning model 222.

More specifically, the on-demand model instantiation system 102 (or the scheduler 204 via a client application) instantiates the machine-learning model 222 based on the model ID 208 at the server 220 selected according to the task attributes 212. For example, the on-demand model instantiation system 102 communicates with the cloud-based storage system 108 to determine that the server 220 has computing hardware that corresponds to a computing hardware configuration indicated in the task attributes 212. To illustrate, the on-demand model instantiation system 102 utilizes the scheduler 204 to monitor an availability status of a plurality of servers at the on-demand cluster 218 (e.g., by determining whether the servers are in use by client devices or systems). For example, the on-demand cluster 218 includes a plurality of pre-built images of machine-learning models that expose a secure shell connection. In one or more embodiments, the on-demand cluster 218 includes a plurality of servers across a plurality of different cloud-based computing systems. In one or more embodiments, the on-demand model instantiation system 102 also verifies that the server 220 includes a computing hardware configuration compatible with the task attributes 212.

Additionally, the on-demand model instantiation system 102 instantiates the machine-learning model 222 by sending data associated with the machine-learning model to the server 220 (e.g., directly or via the cloud-based storage system 108). For instance, the on-demand model instantiation system 102 utilizes the dataset 210 in the instantiation data 206 to learn parameters of the machine-learning model 222 instantiated at the server 220. Specifically, the on-demand model instantiation system 102 stores the dataset 210 at the cloud-based storage system 108 based on the instantiation data 206 and then utilizes the dataset 210 to train the machine-learning model 222 at the server 220 of the on-demand cluster 218. In some embodiments, the on-demand model instantiation system 102 also utilizes the on-demand cluster 218 to store the machine-learning models 214 and/or the datasets 216 for use in instantiating the machine-learning model 222 and then training the machine-learning model 222 with the dataset 210. Alternatively, in some embodiments, the client device provides the dataset 210 directly to the server 220 for learning parameters of the machine-learning model 222.

As illustrated in FIG. 2, the on-demand model instantiation system 102 utilizes the machine-learning model 222 to determine and provide generated data 224 based on the dataset 210. To illustrate, in connection with performing a natural language understanding task, the machine-learning model 222 includes a natural language understanding model for classifying natural language samples within the dataset 210. The machine-learning model 222 thus generates a plurality of classifications for the natural language samples. For example, the machine-learning model 222 utilizes an inside-outside-beginning format for natural language to classify natural language samples in the dataset 210. In some embodiments, the generated data 224 includes classifications corresponding to the inside-outside-beginning format.

In additional embodiments, the on-demand model instantiation system 102 also provides additional information to the client device in connection with the generated data 224. For instance, the on-demand model instantiation system 102 utilizes classifications in the generated data 224 to generate a confusion matrix for the dataset 210. Specifically, the on-demand model instantiation system 102 maps data samples in the dataset 210 to cells in the confusion matrix and provides the confusion matrix with the mappings to the client device within an interactive graphical user interface. The interactive graphical user interface can include detailed information about specific classes and corresponding data samples from the dataset 210.

According to one or more embodiments, the on-demand model instantiation system 102 stores datasets (e.g., at the cloud-based storage system 108) including changes made to the datasets in connection with instantiating the machine-learning model 222. For instance, FIG. 2 illustrates that before, during, or after the on-demand model instantiation system 102 trains the machine-learning model 222, the on-demand model instantiation system 102 provides entered test data 226 to the server 220. In one or more embodiments, the entered test data 226 includes a specific training algorithm to the server 220 for training the machine-learning model 222. In one or more additional embodiments, the entered test data 226 includes modifications to the dataset 210 based on the generated data 224. For example, the generated data 224 can include misclassified data samples indicated by a confusion matrix. Based on the confusion matrix, the on-demand model instantiation system 102 modifies the misclassified data samples or the training algorithm and then provides the modified data samples and/or training algorithm to the server 220 to use in further training or re-training the machine-learning model 222.

In one or more embodiments, after the server 220 trains the machine-learning model 222 utilizing the dataset 210, the server re-uploads the dataset 210 to the on-demand model instantiation system 102 (e.g., at the cloud-based storage system 108). For example, by providing the dataset 210 to the server 220, the on-demand model instantiation system 102 improves the efficiency and data security in connection with training the machine-learning model 222 at the server 220. Specifically, the on-demand model instantiation system 102 provides control over the training of the machine-learning model 222 and modifications to the dataset 210 based on the generated data 224 to a client device. After training the machine-learning model 222 at the server 220, the on-demand model instantiation system 102 receives the dataset 210 from the server 220 and stores the dataset 210 (e.g., at the cloud-based storage system 108 including any changes made to the dataset 210).

According to one or more embodiments, after the on-demand model instantiation system 102 has instantiated and trained a selected machine-learning model, the on-demand model instantiation system 102 utilizes the machine-learning model to perform a machine-learning task. To illustrate, the on-demand model instantiation system 102 manages the instantiated machine-learning model on a cloud-based computing device and provides data from one or more client devices to the machine-learning model. For example, the on-demand model instantiation system 102 utilizes the machine-learning model at the cloud-based computing device to receive and process natural language user inputs from a plurality of different client devices in connection with performing a digital image editing task. Alternatively, after training the machine-learning model, the on-demand model instantiation system 102 provides access to the machine-learning model to the client devices to download for instantiation at the individual client devices.

Figure 3:
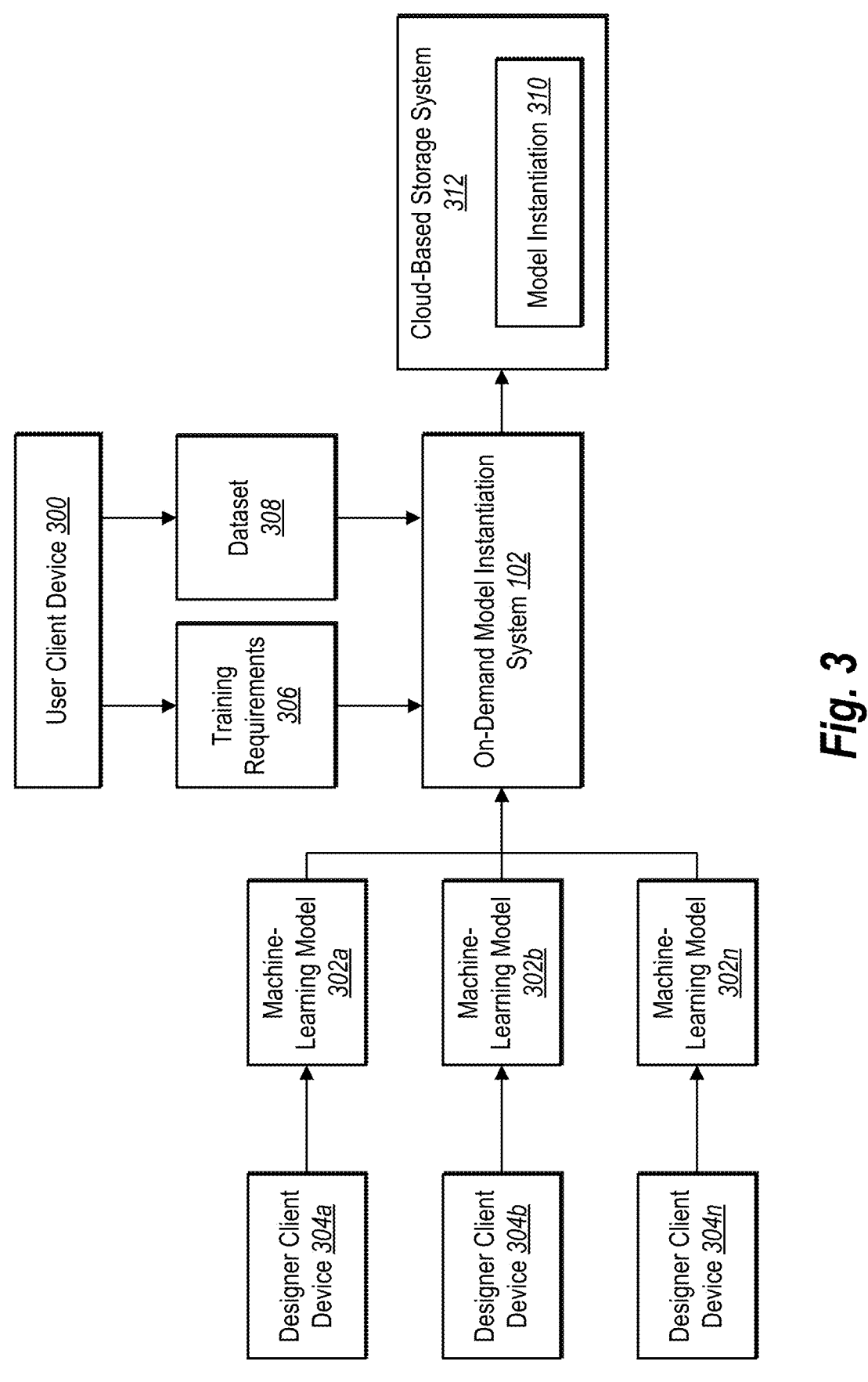
FIG. 3 illustrates an overview diagram of the on-demand model instantiation system selecting a model from a plurality of models for a model instance in accordance with one or more implementations.

As described previously, in one or more embodiments, the on-demand model instantiation system 102 provides instantiation of a plurality of different machine-learning models. FIG. 3 illustrates an overview of the on-demand model instantiation system 102 receiving a plurality of different machine-learning models from which a model user can select. FIG. 3 further illustrates that the on-demand model instantiation system 102 instantiates a selected machine-learning model based on instantiation data from the model user.

FIG. 3 illustrates that the on-demand model instantiation system 102 receives a request from a user client device 300 to instantiate a machine-learning model. For example, the on-demand model instantiation system 102 receives a selection of a machine-learning model from a plurality of machine-learning models 302a-302n. Specifically, as illustrated in FIG. 3, the on-demand model instantiation system 102 receives the plurality of machine-learning models 302a-302n from a plurality of designer client devices 304a-304n. As suggested, each of the designer client devices 304a-304n generates and/or otherwise provides a machine-learning model to the on-demand model instantiation system 102. In one or more embodiments, the machine-learning models 302a-302n include a variety of different models for performing one or more machine-learning tasks.

In addition to providing the machine-learning models 302a-302n to the on-demand model instantiation system 102, in one or more embodiments, the designer client devices 304a-304n also provide interfaces for interacting with the machine-learning models 302a-302n. To illustrate, the designer client devices 304a-304n generate a method of providing one or more commands to computing devices to train or otherwise utilize the machine-learning models 302a-302n.

For instance, the designer client devices 304a-304n provide data or code for integrating an interface (e.g., a command-line interface) corresponding to the machine-learning models 302a-302n via the on-demand model instantiation system 102. In at least some embodiments, the one or more commands include "/train" to connect to a training algorithm/code of an underlying model, "/is_free" that returns information associated with the utilization of the model instantiation (e.g., hardware usage), "/test" to connect to a testing code of the underlying model, or "/notebook" to connect to a notebook URL packaged in an image of the instantiation. In additional embodiments, the on-demand model instantiation system 102 also provides additional training metrics or commands from one or more existing model training processes.

In one or more embodiments, a command-line interface includes an interface by which a user of a computing device issues commands to the computing device. Additionally, a command-line interface integration includes, or is displayed within, a graphical user interface in connection with an instantiation of a machine-learning model. For example, a command-line interface integration with a machine-learning model includes a prompt for text inputs to make one or more calls to a machine-learning model or to a device running the machine-learning model. Accordingly, in one or more embodiments, the on-demand model instantiation system 102 receives command-line interface integrations for the plurality of machine-learning models 302*a*-302*n*. In some embodiments, the command-line interface integrations for different machine-learning models correspond to different programming languages. To illustrate, a first machine-learning model 302*a* corresponds to a first programming language, and a second machine-learning model 302*b* corresponds to a second programming language.

As illustrated in FIG. 3, the on-demand model instantiation system 102 receives data associated with instantiating a machine-learning model from the user client device 300. Specifically, in connection with the request to instantiate a selected machine-learning model (e.g., the first machine-learning model 302*a*), the on-demand model instantiation system 102 also receives instantiation data from the user client device 300. For example, the on-demand model instantiation system 102 receives a selection or other indication of training requirements 306 and a dataset 308 from the user client device 300.

In one or more embodiments, the training requirements 306 include a training algorithm for training the selected machine-learning model. For instance, the user client device 300 generates or otherwise determines an algorithm for training a machine-learning model for a particular machine-learning task. The user client device 300 then sends the determined algorithm to the on-demand model instantiation system 102 for learning parameters of the selected machine-learning model. Alternatively, the user client device 300 sends a request to the on-demand model instantiation system 102 to utilize a particular training algorithm stored via the on-demand model instantiation system 102 or a third-party system, such as a default training algorithm for the selected machine-learning model or machine-learning task.

Additionally, in one or more embodiments, the user client device 300 provides the dataset 308 to the on-demand model instantiation system 102 in connection with a selected machine-learning model. Specifically, the dataset 308 includes a plurality of data samples for training the selected machine-learning model of the plurality of machine-learning models 302*a*-302*n* according to the training requirements 306. To illustrate, as mentioned, the on-demand model instantiation system 102 provides the dataset 308 to the on-demand model instantiation system 102 after selecting the machine-learning model. In other embodiments, the on-demand model instantiation system 102 receives the dataset 308 from the user client device 300 or another computing device prior to the selection of the machine-learning model and stores the dataset 308 for use with one or more machine-learning models.

As further illustrated in FIG. 3, the on-demand model instantiation system 102 utilizes the selected machine-learning model to generate a model instantiation 310 at a cloud-based storage system 312. In particular, the on-demand model instantiation system 102 determines a location at the cloud-based storage system 312 according to one or more attributes of a machine-learning task and/or based on the selected machine-learning model. The on-demand model instantiation system 102 generates the model instantiation 310 at the determined location of the cloud-based storage system 312. Additionally, in one or more embodiments, the on-demand model instantiation system 102 learns parameters of the machine-learning model via the model instantiation 310 by utilizing the training requirements 306 (e.g., a training algorithm) and the dataset 308.

As mentioned, the on-demand model instantiation system 102 provides improved flexibility and efficiency for on-demand instantiation of machine-learning models. FIGS. 4A-4J illustrate a plurality of graphical user interfaces associated with a user of a machine-learning model. Specifically, FIGS. 4A-4J illustrate graphical user interfaces in connection with creating/editing a dataset, determining attributes of a machine-learning task, selecting and training a machine-learning model, and displaying processing results of a machine-learning model.

Figure 4A:
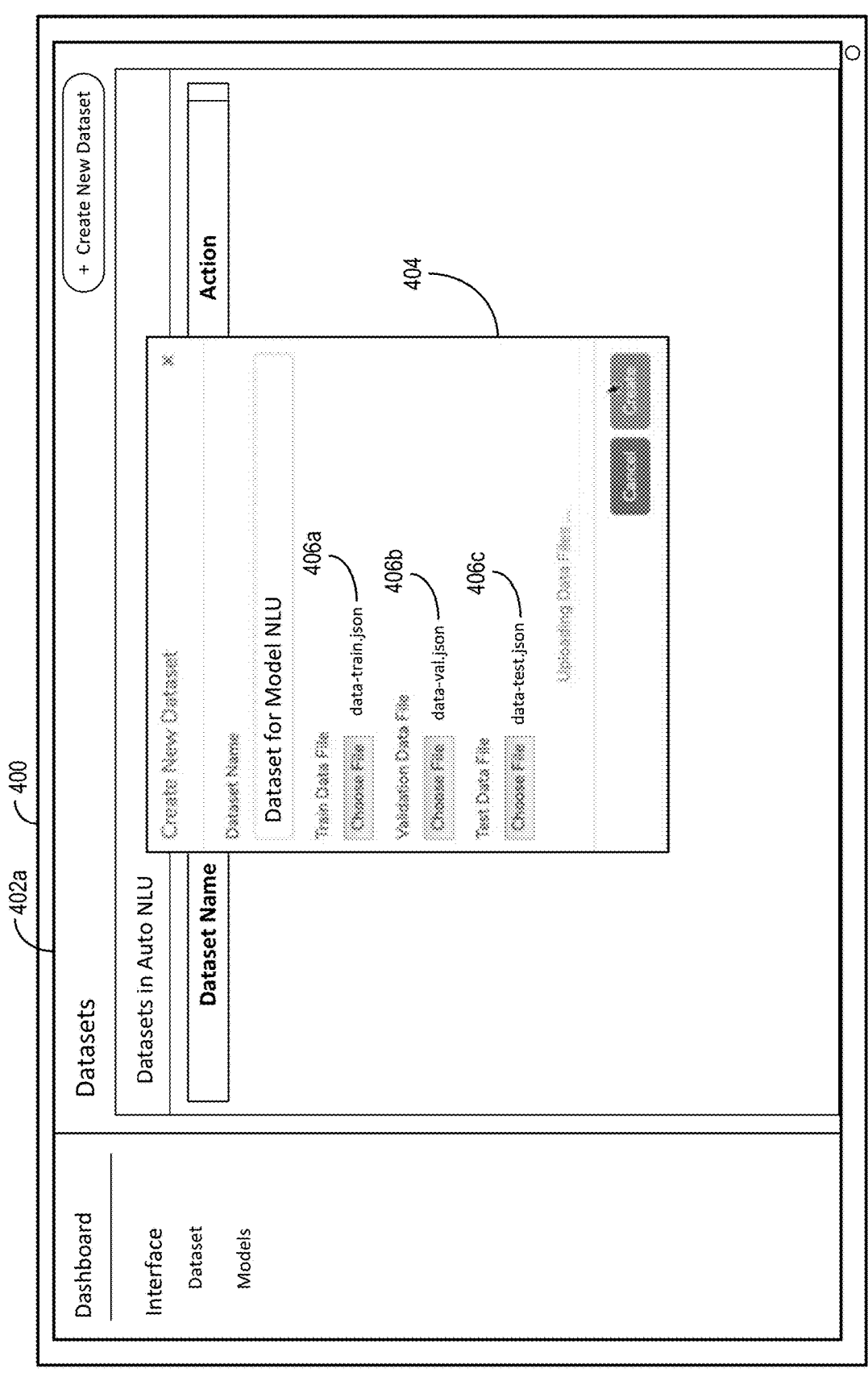

In one or more embodiments, as illustrated in FIG. 4A, the on-demand model instantiation system 102 provides, for display at a client device 400, a graphical user interface 402*a* for performing operations in connection with instantiating a machine-learning model. In particular, the client device 400 of FIG. 4A displays an overlay 404 including a plurality of options for generating a dataset to use in connection with one or more machine-learning model instantiations. For instance, the overlay 404 includes one or more options to select one or more data files to use in training, validating, and/or testing a machine-learning model. To illustrate, client device displays a first option 406*a* for selecting a training dataset, a second option 406*b* for selecting a validation dataset, and a third option 406*c* for selecting a testing dataset.

In response to an interaction via the graphical user interface 402*a* to select a particular data file, the client device 400 uploads the selected data file(s) to the on-demand model instantiation system 102. For example, the on-demand model instantiation system 102 uploads a selected training dataset, validation dataset, and/or test dataset to the on-demand model instantiation system 102. In one or more embodiments, the client device 400 uploads the datasets in the same connection session or during separate connection sessions. Additionally, in some embodiments, the client device 400 also provides a name for the dataset. The on-demand model instantiation system 102 associates the name of the dataset with each of the data files including training dataset, validation set, and test dataset.

Figure 4B:
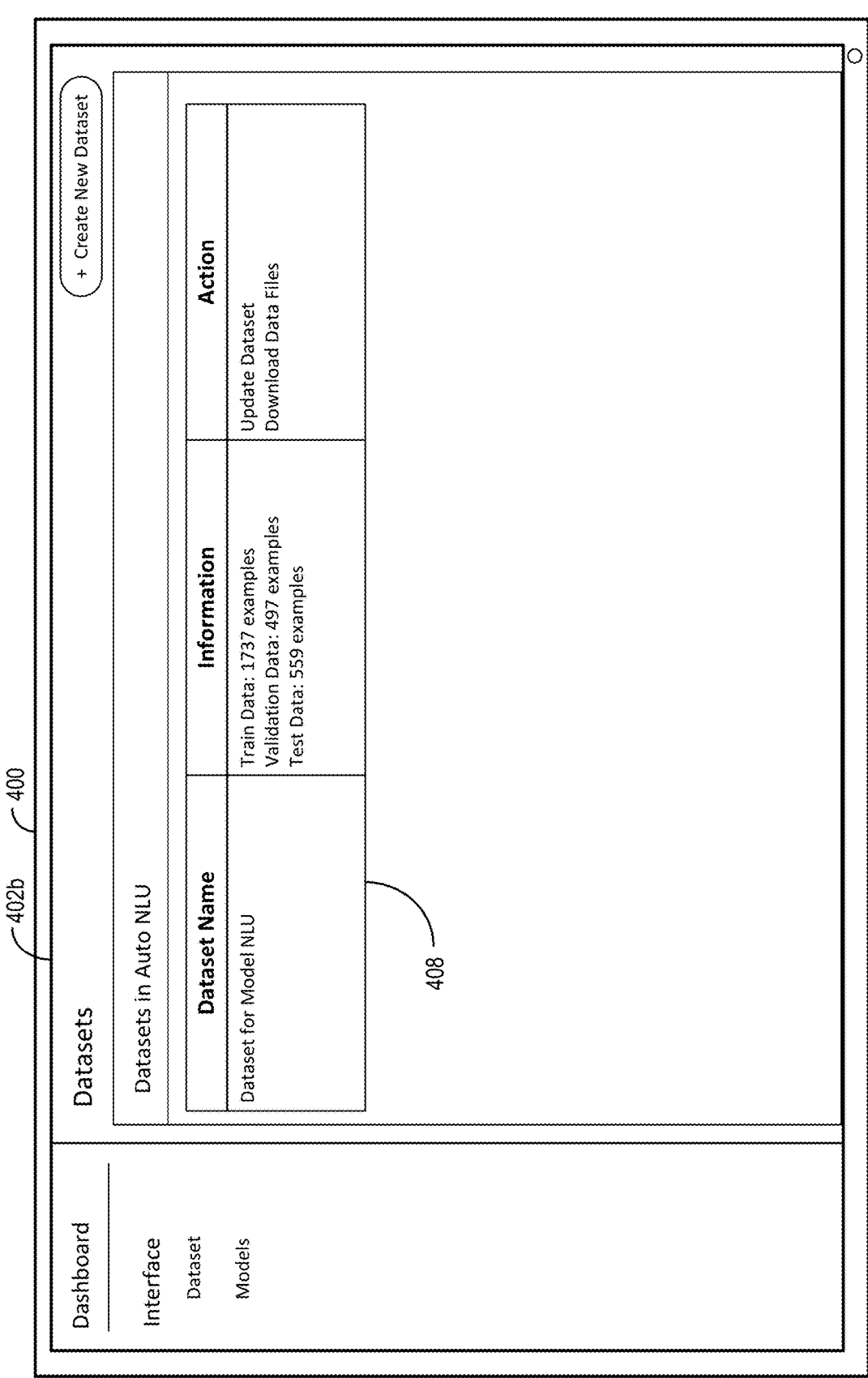

After the client device 400 uploads or otherwise indicates a dataset to the on-demand model instantiation system 102, in one or more embodiments, the on-demand model instantiation system 102 stores information associated with the dataset. Furthermore, as illustrated in FIG. 4B, the on-demand model instantiation system 102 provides a dataset entry 408 within a list of datasets for display within a graphical user interface 402*b* of the client device 400. Although FIG. 4B illustrates only the dataset entry 408, the list of datasets may include any number of datasets uploaded by the client device 400 (or other devices associated with a user of the client device 400). For example, the client device 400 displays the list of datasets including a plurality of uploaded datasets for use in connection with a plurality of separate machine-learning tasks.

As further shown in FIG. 4B, the client device 400 displays, via the dataset entry 408, that the dataset includes a plurality of data samples. Specifically, the on-demand model instantiation system 102 provides an indication of training data samples, validation data samples, and/or test data samples uploaded to the on-demand model instantiation system 102 for display at the client device 400. Additionally, in one or more embodiments, the client device 400 also provides options to update the dataset and/or download one or more portions of the dataset.

Figure 4C:
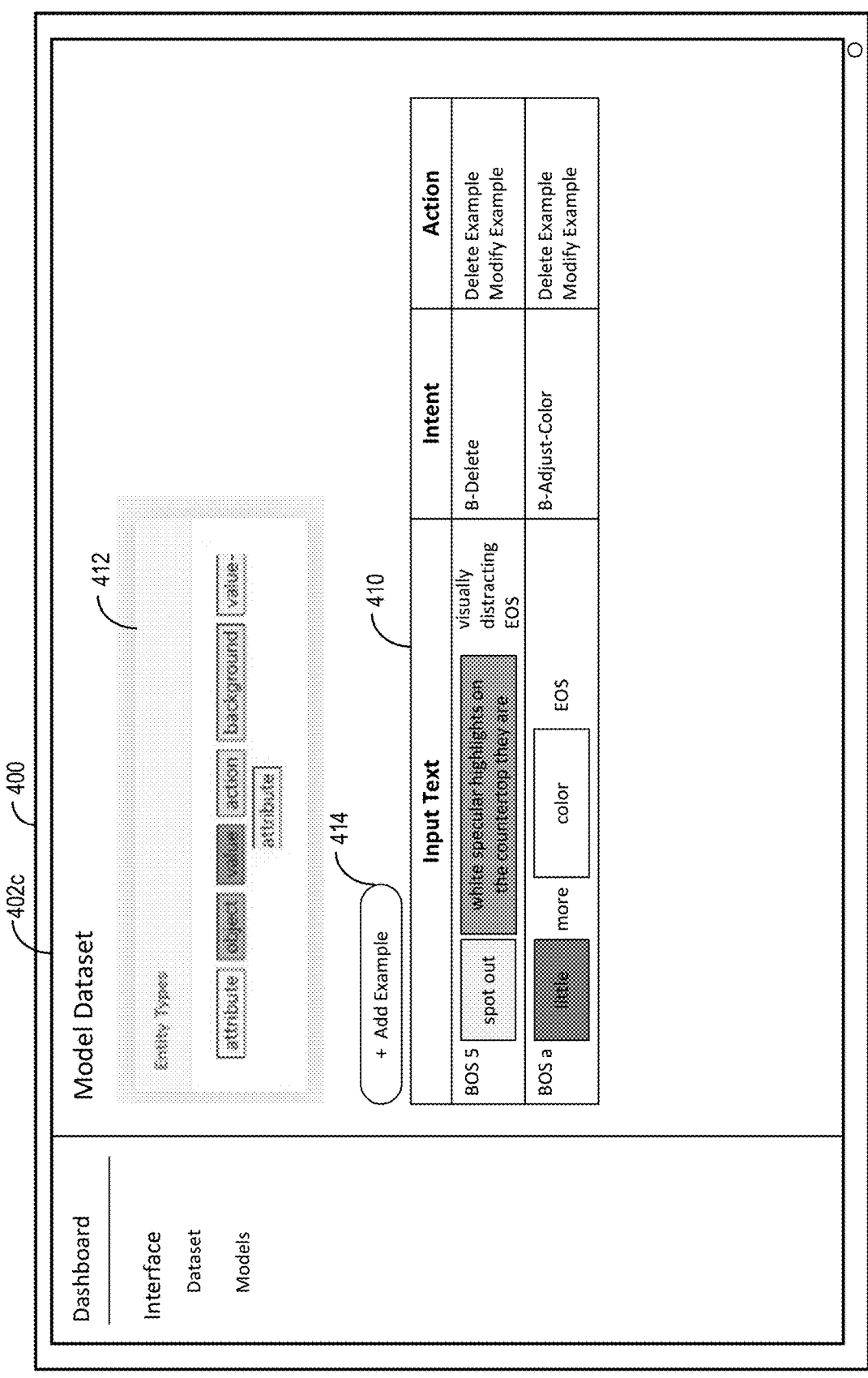

In one or more embodiments, in response to a selection to modify a dataset, the on-demand model instantiation system 102 provides tools for modifying data samples in the dataset. For instance, FIG. 4C illustrates that the client device 400 displays a plurality of data samples 410 in a selected dataset. In addition, the on-demand model instantiation system 102 provides the data samples 410 with one or more labels corresponding to entities of the data samples. To illustrate, for a dataset including natural language samples, the client device 400 displays each natural language sample including one or more labels indicating words or phrases that correspond to one or more entity types.

Additionally, in some embodiments, the on-demand model instantiation system 102 provides an entity type list 412 that displays a plurality of different entity types in the dataset. Specifically, the labels of the data samples correspond to entity types determined upon creation of the dataset. For example, the on-demand model instantiation system 102 determines that the dataset includes entity types, such as attributes, objects, values, actions, background, or value-attributes. The entity types can depend upon classification of data determined by a creator of the dataset. In some embodiments, the entity types correspond to a set of default entity types for the type of data in the dataset, such as natural language data. In one or more embodiments, the on-demand model instantiation system 102 includes color-coded icons corresponding to the different entity types.

As further shown in FIG. 4C, in one or more embodiments, the on-demand model instantiation system 102 determines an intent of each data sample of the dataset. For instance, the on-demand model instantiation system 102 determines, based on metadata associated with the dataset, an intent of each data sample in connection with a particular machine-learning task. In particular, the on-demand model instantiation system 102 determines the intent of each data sample relative to a list of possible operations for the machine-learning task. To illustrate, for a machine-learning task in which the on-demand model instantiation system 102 interprets natural language to perform one or more operations in an image editing application, the on-demand model instantiation system 102 determines the type of operation corresponding to each data sample. The on-demand model instantiation system 102 provides the intent for each data sample to the client device 400 for display within a graphical user interface 402c.

In some embodiments, as illustrated in FIG. 4C, the on-demand model instantiation system 102 provides options to modify the dataset. To illustrate, the client device 400 displays an add option 414 to add a data sample. Specifically, the on-demand model instantiation system 102 provides the add option 414 to add new data samples to an existing dataset. Alternatively, the on-demand model instantiation system 102 provides options to modify or delete existing data samples in the dataset.

Figure 4D:
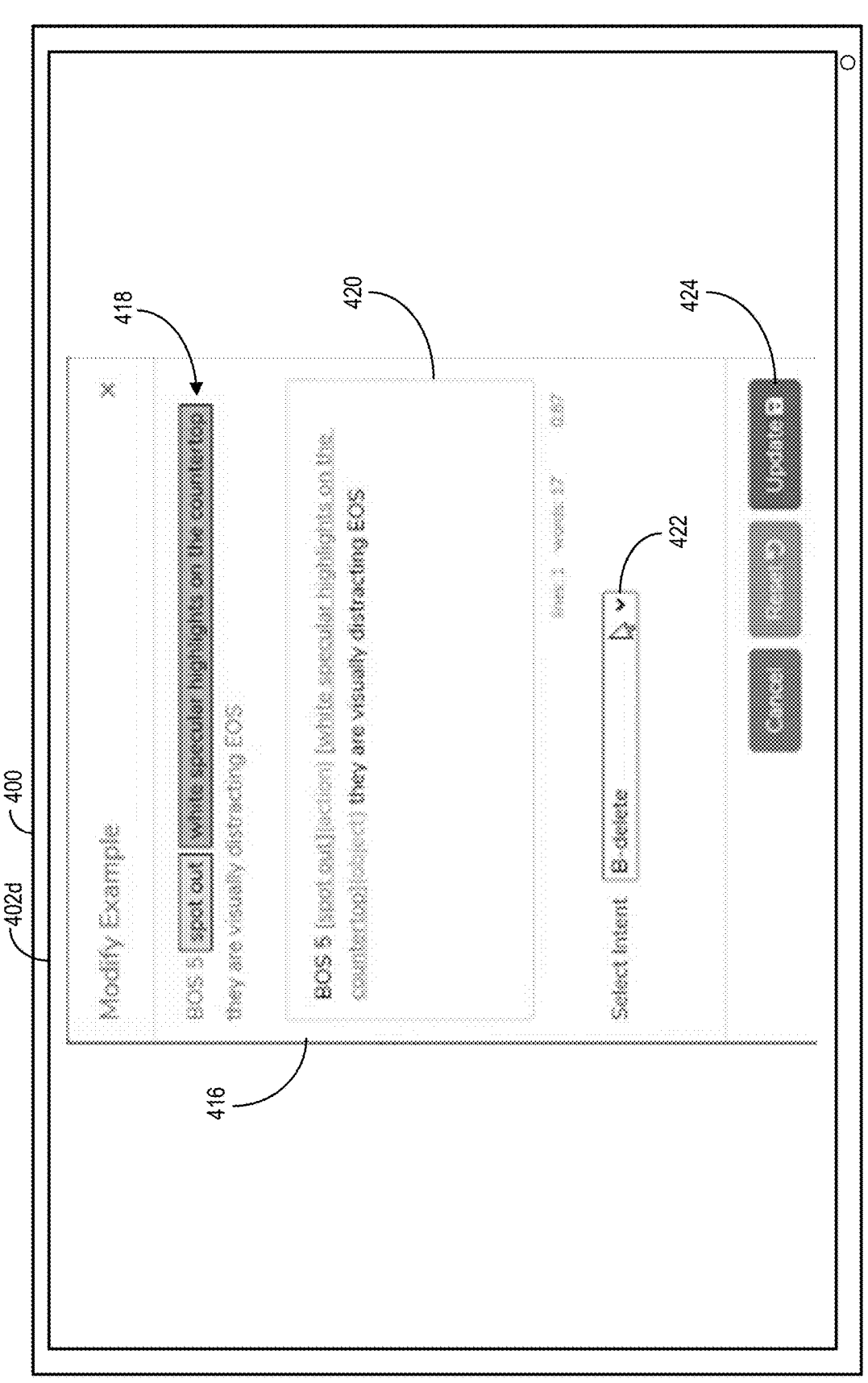

As mentioned, in some embodiments, the on-demand model instantiation system 102 provides tools for modifying existing data samples in a dataset. For example, as illustrated in FIG. 4D, the client device 400 displays a modification interface 416 (e.g., a dataset annotation interface) as part (or as an entirety) of a graphical user interface 402d. In one or more embodiments, the client device 400 displays a selected data sample 418 including one or more labeled entity types within the modification interface 416 with a simplified representation of the labeled entity types. To illustrate, the client device 400 displays color-coded boxes, grey-scale-coded boxes, or other visual indicators for text corresponding to the labeled entity types within the modification interface 416. According to some embodiments, the client device 400 provides a plurality of tools to annotate data samples in the dataset.

As further shown in FIG. 4D, the client device 400 displays an initial representation 420 of the selected data sample 418. More specifically, the initial representation 420 includes labels of the entity types according to a labeling format determined by a dataset creator. For instance, when generating a dataset and/or a data sample within the dataset, a dataset creator inputs text according to the labeling format to indicate specific entity types for content (e.g., specific words or phrases) within a data sample. The on-demand model instantiation system 102 determines the entity types based on the labeling format and then generates the simplified representation of the labeled entity types for display at the client device 400. As previously mentioned, in one or more embodiments, the on-demand model instantiation system 102 converts the initial representation 420 to an intermediate representation prior to (or otherwise in connection with) displaying the selected data sample 418 with the labeled entity types at the client device 400.

As suggested above, in one or more embodiments, the on-demand model instantiation system 102 also provides tools for interacting with (e.g., editing) a data sample. To illustrate, the client device 400 receives text input to modify one or more labels or text associated with the selected data sample 418 via a portion of the modification interface 416. In some embodiments, the client device 400 also updates the simplified representation of the selected data sample 418 in response to detecting changes to the initial representation 420 via the modification interface 416.

In addition, in one or more embodiments, the on-demand model instantiation system 102 provides tools for selecting an intent of a particular data sample. For example, as illustrated in FIG. 4D, the client device 400 displays an intent element 422 for setting or modifying an intent of a natural language data sample (e.g., the selected data sample 418). In one or more embodiments, the intent element 422 includes a dropdown menu including a plurality of possible intent options. To illustrate, the client device 400 receives an input to change or establish the intent of the selected data sample 418 via the intent element 422. The on-demand model instantiation system 102 then determines the intent of the selected data sample 418 based on the selected intent option and stores the intent with the selected data sample 418.

As further illustrated in FIG. 4D, the client device 400 also includes an update element 424 to update a data sample based on changes made within the modification interface 416. For instance, in response to a modification to the initial representation 420 or to the intent of the selected data sample 418 via the intent element 422, the on-demand model instantiation system activates the update element 424 to make the update element 424 selectable. In response to a selection of the update element 424, the client device 400 communicates the changes to the selected data sample 418 to the on-demand model instantiation system 102, and the on-demand model instantiation system 102 stores the changed data with the selected data sample 418 in the corresponding dataset. In some embodiments, the client device 400 provides additional options for canceling or resetting modifications to the selected data sample 418.

Figure 4E:
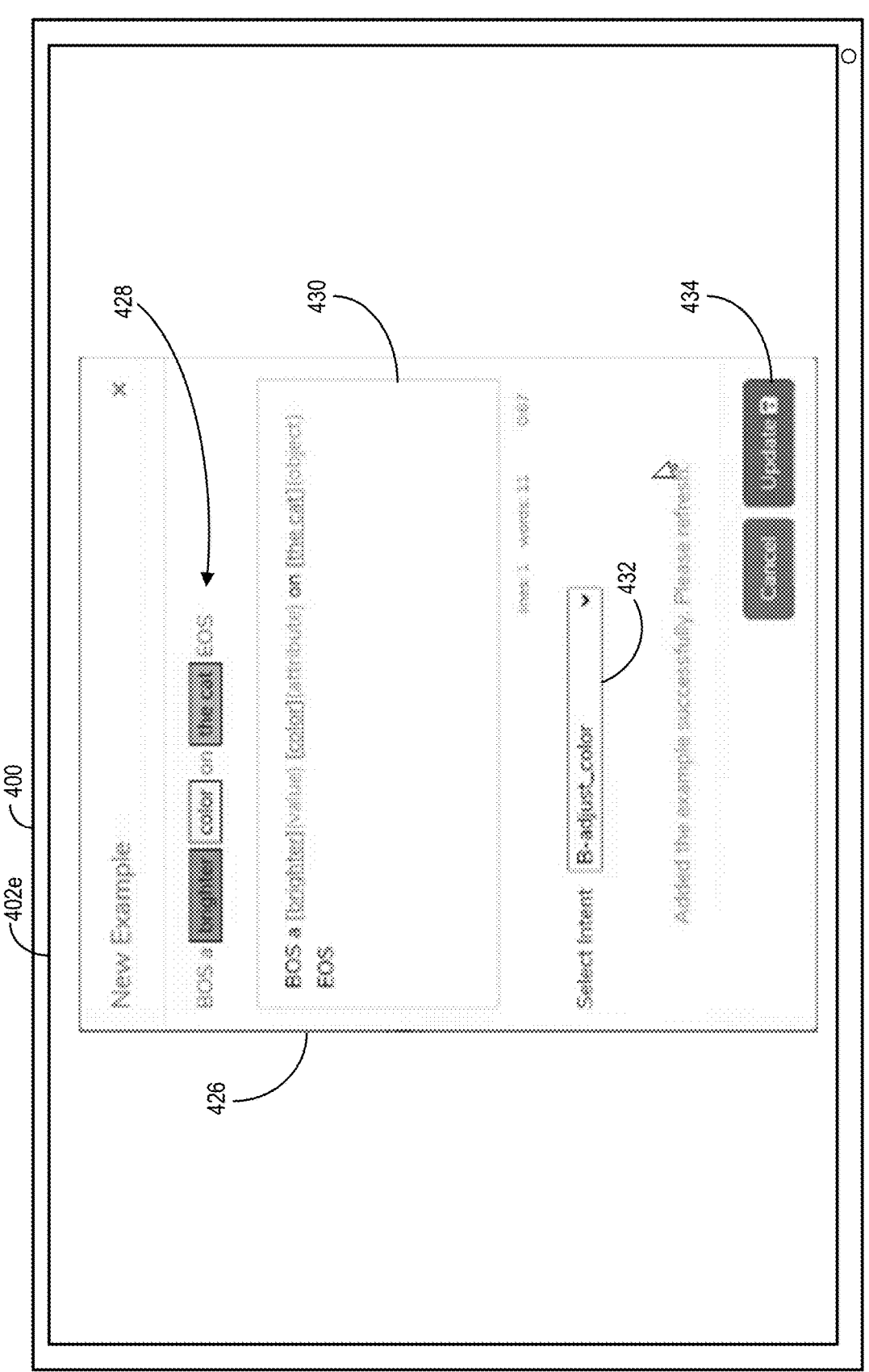

As mentioned, the on-demand model instantiation system 102 also provides tools for adding new data samples to a dataset. As illustrated in FIG. 4E, the client device 400 displays new sample interface 426 as part (or as an entirety) of a graphical user interface 402e. In one or more embodiments, the client device 400 displays a new data sample 428 to add to the dataset. In particular, similar to the selected data sample 418 of FIG. 4D, the client device 400 displays color-coded boxes, grey-scale-coded boxes, or other visual indicators for text corresponding to labeled entity types within the new sample interface 426. Furthermore, the client device 400 displays a new initial representation 430 of the new data sample 428 as entered by a user via the new sample interface 426, which also determines the labeled entity types of the new data sample 428. The client device 400 also includes a new intent element 432 to indicate an intent of the new data sample 428.

As further shown in FIG. 4E, according to one or more embodiments, the client device 400 includes an add element 434 to add a data sample to a dataset based on information entered into the new sample interface 426. To illustrate, in response to a selection of the add element 434, the client device 400 provides information associated with generating the new data sample 428 to the on-demand model instantiation system 102. The on-demand model instantiation system 102 generates a new data sample entry in the corresponding dataset including the information associated with generating the new data sample 428. Accordingly, the on-demand model instantiation system 102 increases the size of the dataset by one entry with each new data sample added to the dataset.

As mentioned previously, in some embodiments, the on-demand model instantiation system 102 provides on-demand instantiation of machine-learning models via cloud-based storage systems. For example, the on-demand model instantiation system 102 provides options for selecting a machine-learning model and scheduling instantiation of the machine-learning model. To illustrate, the on-demand model instantiation system 102 schedules instantiation of the machine-learning model by determining attributes of a machine-learning task and availability of cloud-based computing devices.

In one or more embodiments, the on-demand model instantiation system 102 also provides customizability of an instantiation of a machine-learning model. Specifically, the on-demand model instantiation system 102 provides options to schedule instantiation according to one or more customized attributes of a machine-learning task. The on-demand model instantiation system 102 then utilizes the attribute(s) of the machine-learning task to determine a particular computing device to instantiate the selected machine-learning model.

Figure 4F:
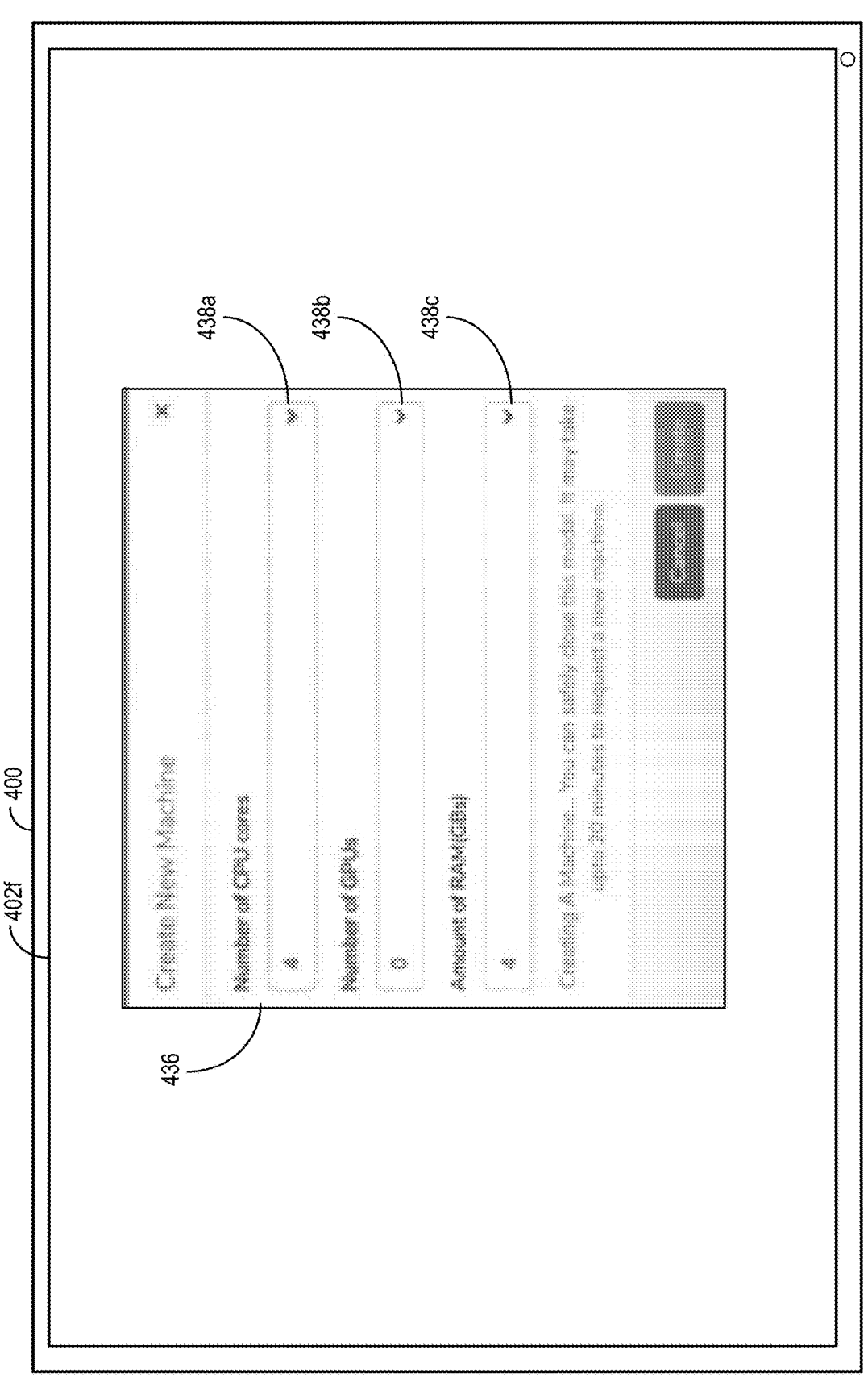

As illustrated in FIG. 4F, the client device 400 displays a task attribute interface 436 as part (or as an entirety) of a graphical user interface 402*f* For instance, the on-demand model instantiation system 102 determines a computing hardware configuration for instantiating a machine-learning model for a machine-learning task. To illustrate, the on-demand model instantiation system 102 determines processing requirements, computer memory requirements, or other hardware requirements for running the machine-learning model. Additionally, in one or more embodiments, the on-demand model instantiation system 102 determines an amount of time for running the machine-learning model (e.g., based on the computing hardware requirements).

Furthermore, in connection with customizing attributes of a machine-learning task, the on-demand model instantiation system 102 provides a plurality of options for setting a computing hardware configuration. As illustrated in FIG. 4F, the client device 400 displays a computer processor element 438*a*, a graphics processor element 438*b*, and a memory element 438*c*. In particular, the client device 400 displays a plurality of values of computer processing units (e.g., 4 cores) in response to a selection of the computer processor element 438*a*. The client device 400 also displays a plurality of values of graphics processor units (e.g., a particular graphics processing unit) in response to a selection of the graphics processor element 438*b*. Additionally, the client device 400 displays a plurality of values of memory devices (e.g., 8 GBs of RAM) in response to a selection of the memory element 438*c*.

In response to a selection of a plurality of values for each of the elements, the client device 400 determines a computing hardware configuration for a corresponding machine-learning task. In one or more embodiments, the client device 400 also sends the computing hardware configuration to the on-demand model instantiation system 102 for use in instantiating a machine-learning model. For example, the on-demand model instantiation system 102 utilizes the computing hardware configuration to determine one or more cloud-based computing devices to use for instantiating the machine-learning model. Additionally, in one or more embodiments, the on-demand model instantiation system 102 receives a request to assign a particular machine-learning task to a specific machine-learning model instantiation or to a machine-learning model as determined by the on-demand model instantiation system 102.

Figure 4G:
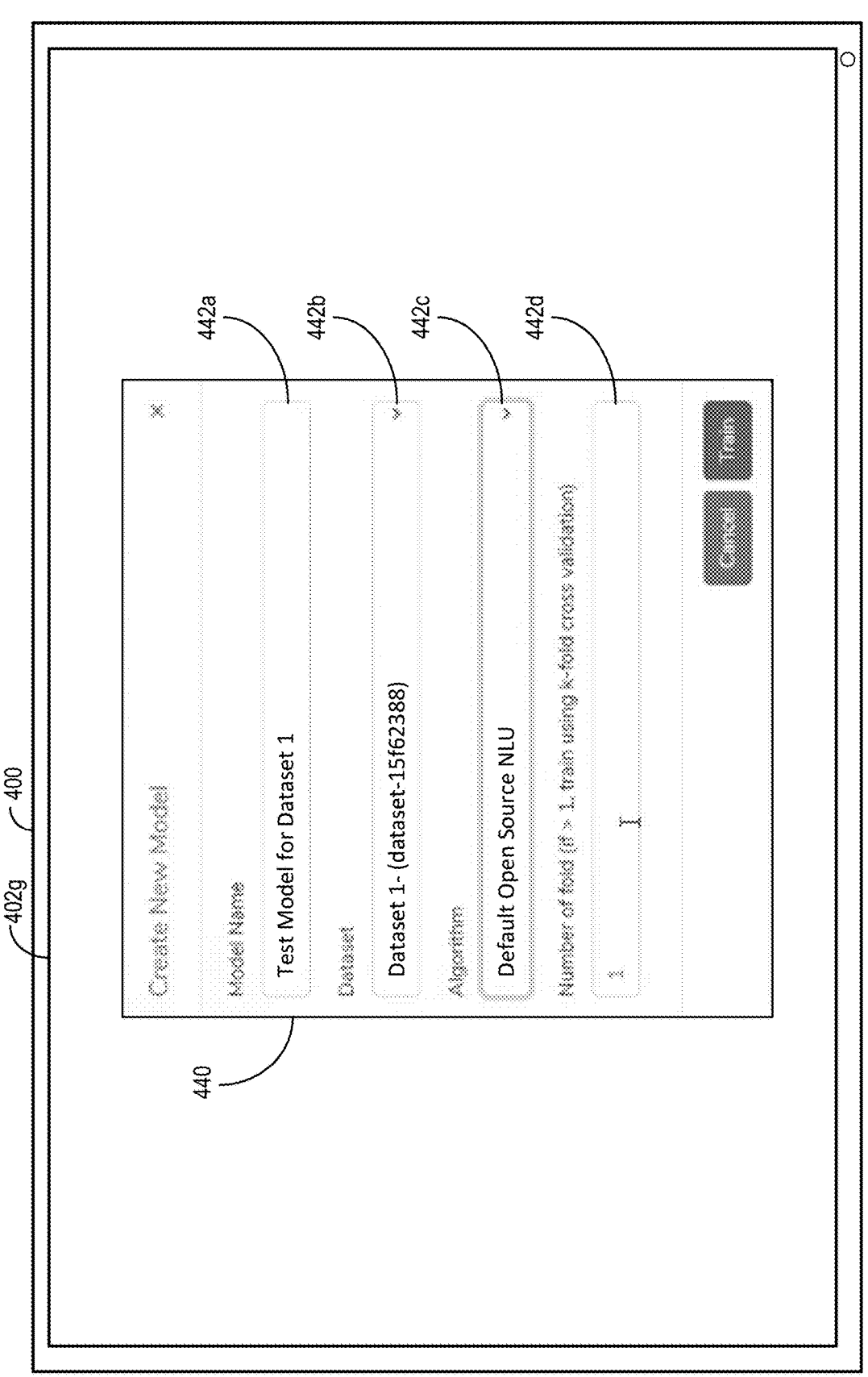

In one or more additional embodiments, the on-demand model instantiation system 102 also determines additional information associated with a machine-learning model for instantiating the machine-learning model. As illustrated in FIG. 4G, the client device 400 displays a plurality of options for customizing the machine-learning model, the dataset for training the machine-learning model, and a training algorithm for training the machine-learning model. Specifically, FIG. 4G illustrates a model instantiation interface 440 as part (or as an entirety) of a graphical user interface 402*g* of the client device 400. The client device 400 displays a model name field 442*a*, a dataset selection element 442*b*, a training algorithm element 442*c*, and a training fold element 442*d*.

For example, in response to a text input or other model selection input via the model name field 442*a*, the on-demand model instantiation system 102 instantiates a machine-learning model. Additionally, in response to an input via the dataset selection element 442*b*, the on-demand model instantiation system 102 determines a dataset to use in connection with instantiating the machine-learning model. In some cases, the dataset selection element 442*b* constitutes a drop-down menu comprising various datasets for training a machine-learning model. Furthermore, in response to an input via the training algorithm element 442*c*, the on-demand model instantiation system 102 determines a training algorithm to utilize in training the selected machine-learning model. In some cases, the training algorithm element 442*c* constitutes a drop-down menu comprising various datasets algorithms used to train a machine-learning model (e.g., iteratively learn hyperparameters of the machine-learning model). In response to an input via the training fold element 442*d*, the on-demand model instantiation system 102 also determines a number of training/testing folds in a k-fold cross-validation process for training the machine-learning model.

In one or more embodiments, after determining attributes of a machine-learning task and information associated with instantiating a machine-learning model, the on-demand model instantiation system 102 begins a training process for a machine-learning model. As illustrated in FIG. 4H, for example, the client device 400 displays a model status interface 444*a* as part (or as an entirety) of a graphical user interface 402*h*. More specifically, the client device 400 displays a list of machine-learning model instantiations including a status of each machine-learning model instantiation within the model status interface 444*a*.

In addition to displaying a list of machine-learning model instantiations, in one or more embodiments, the client device 400 also displays a current status of each machine-learning model instantiation within the model status interface 444*a*. For instance, the on-demand model instantiation system 102 provides an indication of whether each machine-learning model instantiation has completed training or is in the process of training. In particular, as illustrated in FIG. 4H, the client device 400 displays a model instantiation entry 446*a* of a machine-learning model instantiation including an ongoing training status 448*a* of the machine-learning model instantiation. To illustrate, the client device 400 displays the model instantiation entry 446*a* including an indication that the on-demand model instantiation system 102 is currently training the corresponding machine-learning model.

After the on-demand model instantiation system 102 has initiated a training process for a particular machine-learning model instantiation, the on-demand model instantiation system 102 monitors the training status. Accordingly, after the on-demand model instantiation system 102 has completed training a particular machine-learning model, the on-demand model instantiation system 102 updates the training status. As shown in FIG. 4I, after the on-demand model instantiation system 102 trains the machine-learning model, the client device 400 refreshes or updates a graphical user interface 402*i* to include a model status interface 444*b*. In particular, the client device 400 displays a completed training status 448*b* within a model instantiation entry 446*b* as part of the model status interface 444*b*. The model instantiation entry 446*b* indicates that the on-demand model instantiation system 102 has completed training the machine-learning model. In some embodiments, the on-demand model instantiation system 102 also provides additional information, such as performance on one or more portions of the dataset (e.g., the validation and testing portions).

As mentioned briefly, in one or more embodiments, the on-demand model instantiation system 102 provides machine-learning models for download and instantiation at requesting client devices. In particular, rather than training a machine-learning model at a cloud-based computing device, the on-demand model instantiation system 102 provides the machine-learning model for download to a client device. The client device then trains the machine-learning model utilizing a training algorithm and a dataset at the client device (or another computing device associated with the client device). In one or more embodiments, the client device also utilizes the trained machine-learning model to process additional data received in connection with performing a machine-learning task such as an image-editing task.

In one or more embodiments, the on-demand model instantiation system 102 also provides additional training information to the client device 400. For example, as mentioned, the on-demand model instantiation system 102 provides interactive data associated with a machine-learning model instantiation. More specifically, the on-demand model instantiation system 102 generates a dataset visualization including interactive data for a dataset by processing the dataset utilizing the corresponding machine-learning model.

Figure 4J:
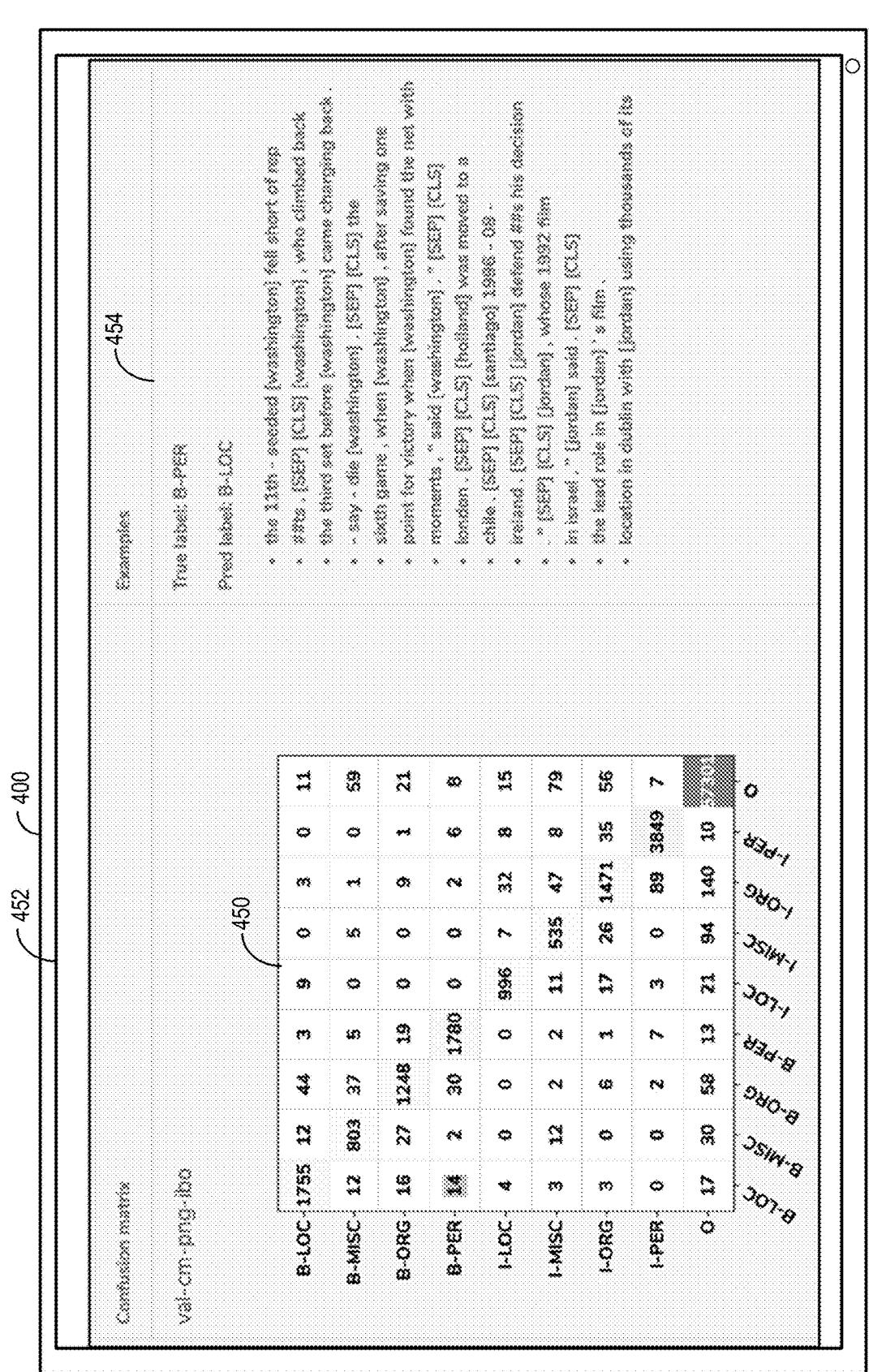

As illustrated in FIG. 4J, for example, the on-demand model instantiation system 102 generates a confusion matrix 450 for a dataset utilizing a selected machine-learning model. In one or more embodiments, the machine-learning model includes a classification model that classifies data samples within the dataset. More specifically, the on-demand model instantiation system 102 utilizes the machine-learning model to classify entity types from data samples in the dataset. Additionally, the on-demand model instantiation system 102 utilizes the classifications to generate the confusion matrix 450 including classification results from the machine-learning model. In one or more embodiments, the client device 400 provides the confusion matrix 450 for display within a dataset visualization 452.

As suggested above, in one or more additional embodiments, the on-demand model instantiation system 102 utilizes the confusion matrix 450 to provide interactive data for the dataset. Additionally, the on-demand model instantiation system 102 provides interactive classification data based on the confusion matrix 450 by mapping cells of the confusion matrix 450 to classifications determined by processing the dataset utilizing the machine-learning model. For example, as further illustrated in FIG. 4J, the client device 400 displays mapped data samples 454 (e.g., words, phrases, sentences) within a portion of the dataset visualization 452 in response to interactions with interactive cells of the confusion matrix 450.

In response to a selection of a particular cell of the confusion matrix 450, the client device 400 obtains data samples mapped to the cell and displays the mapped data samples 454—in addition to a true label of each data sample and a predicted label of the data sample according to the confusion matrix 450. For example, for a particular data sample, the on-demand model instantiation system 102 determines a true label (e.g., B-Person) for a data sample and a predicted label (e.g., B-Location) for the data sample. In response to a selection of a different cell in the confusion matrix 450, the client device 400 updates the graphical user interface to display different mapped data samples corresponding to the different cell. In some embodiments, the on-demand model instantiation system 102 provides the mappings between cells and data samples upon providing the confusion matrix 450 to the client device 400. In alternative embodiments, the on-demand model instantiation system 102 provides the mappings upon receiving selections of cells of the confusion matrix 450 via the client device 400.

In one or more embodiments, by providing the confusion matrix 450 to the client device, the on-demand model instantiation system 102 provides tools for modifying a dataset based on processing data associated with a machine-learning model instantiation. For example, the client device 400 detects inputs that interact with the confusion matrix 450 and displays the mapped data samples 454. The client device 400 also detects inputs to correct errors in the dataset, such as by correcting labels that lead to incorrect predictions via the machine-learning model. In additional embodiments, the client device 400 also receives one or more modifications to data samples in the dataset. The client device 400 then provides the modifications made to the dataset to the on-demand model instantiation system 102. In some embodiments, the on-demand model instantiation system 102 then utilizes the machine-learning model to process the updated dataset and provide the updated interactive data to the client device 400.

In one or more embodiments, the on-demand model instantiation system 102 provides interactive data samples in connection with the confusion matrix 450. For instance, in one or more embodiments, the on-demand model instantiation system 102 links the mapped data samples 454 to the data samples in the dataset. Accordingly, in response to a selection of a data sample from the mapped data samples 454, the client device 400 displays the corresponding data sample from the dataset. More specifically, in some embodiments, the client device 400 detects a selection of a data sample and then displays the corresponding data sample within the modification interface 416 of FIG. 4D. The client device 400 thus utilizes the confusion matrix 450 to provide an efficient method of finding and modifying data samples in a dataset in response to detecting incorrect classification of the data samples utilizing the machine-learning model. In alternative embodiments, the client device 400 provides the dataset visualization 452 and the modification interface 416 of FIG. 4D simultaneously (e.g., within different interfaces or applications) for viewing and modifying the data samples in connection with the confusion matrix 450 at the same time.

As previously described, the on-demand model instantiation system 102 improves the accuracy of computing systems that implement machine-learning model instantiation. Table 1 below indicates a comparison of F1 scores for existing systems and the on-demand model instantiation system 102 trained on two different datasets. As shown by Table 1, the F1 scores indicate that the on-demand model instantiation system 102 provides significant accuracy improvement over the existing systems in terms of training a machine-learning model to accurately classify true or false positive or true or false negatives from extracted phrases.

TABLE 1

| Model | Datasets | |
| --- | --- | --- |
| | Inspec | SE-2017 |
| KEA | 0.137 | 0.129 |
| TextRank | 0.122 | 0.157 |
| SingeRank | 0.123 | 0.155 |
| SGRank | 0.271 | 0.211 |
| Transformer | 0.595 | 0.522 |
| BERT (System 102) | 0.596 | 0.537 |
| SciBERT (System 102) | 0.598 | 0.544 |

In particular, "Inspec" includes a dataset described by Anette Hulth in "Improved automatic keyword extraction given more linguistic knowledge," in EMNLP in 2003. Additionally, "SE-2017" includes a dataset described by Isabelle Augenstein, Mrinal Das, Sebastian Riedel, Lakshmi Vikraman, and Andrew McCallum in "Semeval 2017 task 10: Scienceie—extracting keyphrases and relations from scientific publications," in CoRR in 2017. In one or more embodiments, "BERT (System 102)" refers to a model that the on-demand model instantiation system 102 utilizes as described by Jacob Devlin, Ming-Wei Chang, Kenton Lee, and Kristina Toutanova in "BERT: pre-training of deep bidirectional transformers for language understanding" in CoRR in 2018, which is herein incorporated by reference in its entirety. Additionally, "SciBERT (System 102)" refers to a model that the on-demand model instantiation system 102 utilizes as described by Iz Beltagy, Kyle Leo, and Arman Cohan in "Scibert: A pretrained language model for scientific text," in EMNLP/IJCNLP in 2019. More specifically, Table 1 indicates that the on-demand model instantiation system 102 utilizes the BERT and SciBERT models with F1 scores averaged over three random seeds.

Although Table 1 above illustrates implementations of the on-demand model instantiation system 102 utilizing specific machine-learning models, the on-demand model instantiation system 102 can utilize any machine-learning model.

The specific models utilized by the on-demand model instantiation system 102 in Table 1 above are merely to illustrate performance improvements in those specific embodiments. Accordingly, the on-demand model instantiation system 102 provides instantiation and implementation of any machine-learning models for a variety of different purposes including, but not limited to, natural language understanding tasks or image classification tasks.

Furthermore, "KEA" refers to a model described by Ian H. Witten, Gordon W. Paynter, Eibe Frank, Carl Gutwin, and Craig G. Nevill-Mannin in "Kea: Practical automated keyphrase extraction," in Design and Usability of Digital Libraries: Case Studies in the Asia Pacific in 2005. Additionally, "TextRank" refers to a model described by Rada Mihalcea and Paul Tarau in "Textrank: Bringing order into text," in EMNLP in 2004. "SGRank" refers to a model described by Soheil Danesh, Tamara Sumner, and James H. Martin in "Sgrank: Combining statistical and graphical methods to improve the state of the art in unsupervised keyphrase extraction," in *SEM@NAACL-HLT in 2015. Also, "Transformer" refers to a model described by Dhruva Sahrawat, Debanjan Mahata, Haimin Zhang, Mayank Kulkarni, Agniv Sharma, Rakesh Gosangi, Amanda Stent, Yaman Kumar, Rajiv Ratn Shah, and Roger Zimmermann in "Keyphrase extraction as sequence labeling using contextualized embeddings," in European Conference on Information Retrieval in 2020.

As indicated above and by Table 1, in one or more embodiments, the on-demand model instantiation system 102 utilizes machine-learning by performing keyphrase extraction to extract phrases that best describe a document or content item. In particular, the on-demand model instantiation system 102 utilizes a sequence labeling task for natural language understanding. For example, given an input sequence of tokens $x=\{x_1, x_2, \ldots, x_n\}$, in which the on-demand model instantiation system 102 predicts a sequence of labels $y=\{y_1, y_2, \ldots, y_n\}$ where $y_i \in \{B, I, O\}$ according to an inside-outside-beginning format. Specifically, B denotes the beginning of a keyphrase, I denotes the continuation of a keyphrase, and O corresponds to tokens that are not part of any keyphrase. The on-demand model instantiation system 102 then converts the keyphrases to a common intermediate representation. In one or more embodiments, the on-demand model instantiation system 102 then trains and tunes the machine-learning models by performing hyperparameter tuning using grid search. Table 1 above illustrates a comparison of F1 scores for embodiments of each of the existing models and models of the on-demand model instantiation system 102 trained on the two different datasets utilizing the inside-outside-beginning labeling format.

Additionally, the example in Table 2 below illustrates an embodiment of a machine-learning model producing classification errors for data samples of a particular dataset in connection with providing natural language understanding in image editing applications:

TABLE 2

| True Label | B-adjust_brightness |
| --- | --- |
| Predicted Label | B-adjust_color |
| [[CLS] light ##en the vegetables [SEP]] | |
| [[CLS] make the dirt darker in brown color [SEP]] | |

Furthermore, Table 3 below illustrates a set of scores corresponding to results generated by a plurality of machine-learning models for an image-editing request dataset. Specifically, Table 3 illustrates intent accuracy ("Intent"), slot precision ("SP"), slot recall ("SR"), and slot F1 scores ("SF1") for each model. Additionally, the scores of the models are averaged over three random seeds.

TABLE 3

| Model | Metrics | | | |
| | Intent | SP | SR | SF1 |
| --- | --- | --- | --- | --- |
| JIS | 0.832 | 0.850 | 0.726 | 0.783 |
| RASA | 0.924 | 0.833 | 0.605 | 0.701 |
| System 102 | 0.954 | 0.869 | 0.854 | 0.862 |

"JIS" includes a model described by Xiaodong Zhang and Houfeng Wang in "A joint model of intent determination and slot filling for spoken language understanding," in Proceedings of the Twenty-Fifth International Joint Conference on Artificial Intelligence in 2016. RASA includes a model described by Tom Bocklisch, Joey Faulkner, Nick Pawlowski, and Alan Nichol in "Rasa: Open source language and understanding and dialogue management," in ArXiv in 2017.

"System 102" includes a model instantiated via the on-demand model instantiation system 102 with a custom dataset for natural language understanding in image-editing processes. In particular, the on-demand model instantiation system 102 converted the dataset to an intermediate representation and trained an initial, simple machine-learning model using a fast training algorithm. The on-demand model instantiation system 102 produced an initial, rough confusion matrix that allowed for manual inspection of cells with the largest values, which provided insight into systematic labeling errors in the dataset (e.g., as illustrated in Table 2 above). After the errors were corrected (e.g., utilizing the modification interface 416 of FIG. 4D), the on-demand model instantiation system 102 retrained another model using the new dataset and repeated the above process. In one or more embodiments, the on-demand model instantiation system 102 then trains and fine-tunes a larger machine-learning model that utilizes joint intent classification and slot filling. The resulting dataset provides improved results (shown in Table 3) that significantly outperforms the existing systems.

Figure 5:
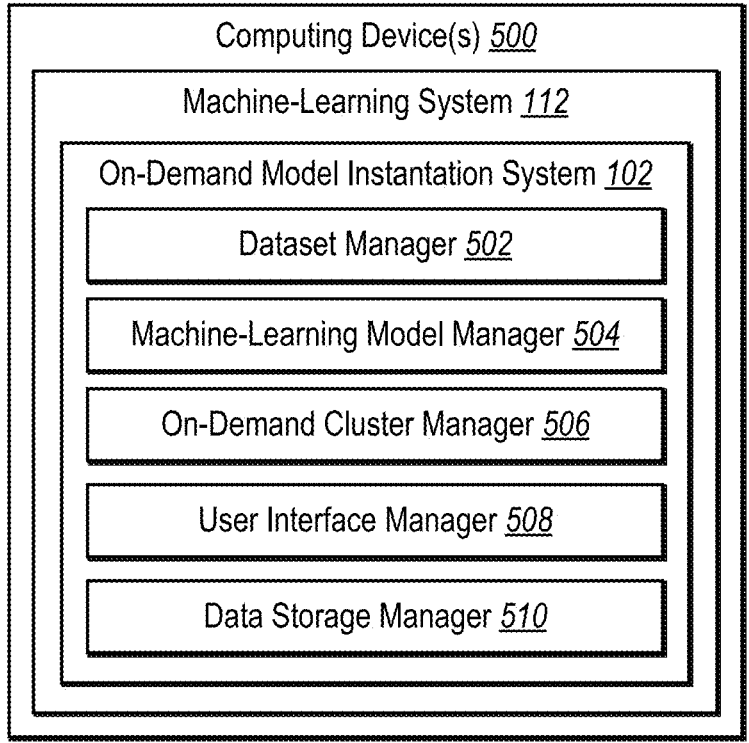
FIG. 5 illustrates a diagram of the on-demand model instantiation system of FIG. 1 in accordance with one or more implementations.

FIG. 5 illustrates a detailed schematic diagram of an embodiment of the on-demand model instantiation system 102 described above. As shown, the on-demand model instantiation system 102 is implemented in a machine-learning system 112 on computing device(s) 500 (e.g., a client device and/or server device as described in FIG. 1, and as further described below in relation to FIG. 7). Additionally, in one or more embodiments, the on-demand model instantiation system 102 includes, but is not limited to, a dataset manager 502, a machine-learning model manager 504, an on-demand cluster manager 506, a user interface manager 508, and a data storage manager 510. The on-demand model instantiation system 102 can be implemented on any number of computing devices. In one or more embodiments, the on-demand model instantiation system 102 is implemented in a distributed system of server devices for digital content editing. In alternative embodiments, the on-demand model instantiation system 102 is implemented within one or more additional systems.

In one or more embodiments, each of the components of the on-demand model instantiation system 102 is in communication with other components using any suitable communication technologies. Additionally, in some embodiments, the components of the on-demand model instantiation system 102 are in communication with one or more other devices including other computing devices of a user, server devices (e.g., cloud-based storage devices/systems), licensing servers, or other devices/systems. It will be recognized that although the components of the on-demand model instantiation system 102 are shown to be separate in FIG. 5, any of the subcomponents may be combined into fewer components, such as into a single component, or divided into more components as may serve a particular implementation. Furthermore, although the components of FIG. 5 are described in connection with the on-demand model instantiation system 102, in one or more embodiments, at least some of the components for performing operations in conjunction with the on-demand model instantiation system 102 described herein are implemented on other devices within the environment.

In some embodiments, the components of the on-demand model instantiation system 102 include software, hardware, or both. For example, the components of the on-demand model instantiation system 102 include one or more instructions stored on a computer-readable storage medium and executable by processors of one or more computing devices (e.g., the computing device(s) 500). When executed by the one or more processors, the computer-executable instructions of the on-demand model instantiation system 102 can cause the computing device(s) 500 to perform the operations described herein. Alternatively, the components of the on-demand model instantiation system 102 can include hardware, such as a special purpose processing device to perform a certain function or group of functions. Additionally, or alternatively, the components of the on-demand model instantiation system 102 can include a combination of computer-executable instructions and hardware.

Furthermore, the components of the on-demand model instantiation system 102 performing the functions described herein with respect to the on-demand model instantiation system 102 may, for example, be implemented as part of a stand-alone application, as a module of an application, as a plug-in for applications, as a library function or functions that may be called by other applications, and/or as a cloud-computing model. Thus, the components of the on-demand model instantiation system 102 may be implemented as part of a stand-alone application on a personal computing device or a mobile device. Alternatively, or additionally, the components of the on-demand model instantiation system 102 may be implemented in any application that provides machine-learning, including, but not limited to ADOBE® PHOTOSHOP®, SENSEI®, ILLUSTRATOR®, or CREATIVE CLOUD® software. "ADOBE", "PHOTOSHOP," "SENSEI," "ILLUSTRATOR," "AND "CREATIVE CLOUD" are either registered trademarks or trademarks of Adobe Inc. in the United States and/or other countries.

As described above, in some embodiments, the on-demand model instantiation system 102 includes a dataset manager 502. For example, the dataset manager 502 manages datasets associated with instantiating one or more machine-learning models. To illustrate, the dataset manager 502 receives datasets from one or more client devices for training machine-learning models. Additionally, the dataset manager 502 manages modifications to datasets by receiving modifications to data samples or new data samples of the datasets.

In one or more embodiments, the on-demand model instantiation system 102 includes a machine-learning model manager 504. The machine-learning model manager 504 manages machine-learning models for instantiating at cloud-based computing device. For instance, the machine-learning model manager 504 received a plurality of machine-learning models from a plurality of client devices associated with model designers. Additionally, the machine-learning model manager 504 determines which machine-learning model to use for a particular machine-learning task.

According to one or more additional embodiments, the on-demand model instantiation system 102 includes an on-demand cluster manager 506. For example, the on-demand cluster manager 506 monitors availability and computing hardware of one or more computing devices of an on-demand cluster associated with one or more cloud-based storage systems. Additionally, the on-demand cluster manager 506 also utilizes attributes of machine-learning tasks to select cloud-based computing devices for instantiating machine-learning models.

The on-demand model instantiation system 102 also includes a user interface manager 508 to manage graphical user interfaces in connection with instantiating machine-learning models such as graphical user interfaces via a web-based client application. For instance, the user interface manager 508 manages one or more graphical user interfaces for generating/editing datasets, training machine-learning models, and interactive data associated with machine-learning model instantiations. Accordingly, the user interface manager 508 manages user input to client devices in connection with instantiating machine-learning models.

The on-demand model instantiation system 102 also includes a data storage manager 510 (that comprises a non-transitory computer memory/one or more memory devices) that stores and maintains data associated with instantiating machine-learning models. For example, the data storage manager 510 stores machine-learning models and datasets. Additionally, the data storage manager 510 stores intermediate representations of datasets, dataset training status updates, classifications generated by machine-learning models, and confusion matrices.

Turning now to FIG. 6, this figure shows a flowchart of a series of acts 600 of for instantiating user-selected machine-learning models at on-demand cloud-based systems with user-defined datasets. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6.

As shown, the series of acts 600 includes an act 602 of receiving a request to instantiate a selected machine-learning model. For example, act 602 involves receiving, from a client device, a request to instantiate a selected machine-learning model from a plurality of available machine-learning models and one or more attributes associated with a machine-learning task. Act 602 can involve receiving, from the client device, an indication of the one or more attributes of the machine-learning task comprising a computing hardware configuration. In one or more embodiments, the machine-learning task comprises a natural language understanding task, and the one or more attributes associated with the machine-learning task comprises a default computing hardware configuration or a user-defined computing hardware configuration.

The series of acts 600 also includes an act 604 of determining a cloud-based computing device. For example, act 604 involves determining, for the selected machine-learning model, a cloud-based computing device corresponding to a cloud-based system. Act 604 includes a further act 604a of monitoring a status of an on-demand cluster. For example, act 604a involves monitoring a status of an on-demand cluster of cloud-based computing devices comprising the cloud-based computing device.

Act 604 also includes a further act 604b of determining that the cloud-based computing device is available. For example, act 604b involves determining that the cloud-based computing device is available and comprises computing hardware compatible with the one or more attributes associated with the machine-learning task. Act 604b can involve determining that the cloud-based computing device comprises computing hardware corresponding to a computing hardware configuration received from the client device.

To illustrate, act 604b can involve selecting, from on-demand instances of cloud-based computing devices, an available computing device that comprises computing hardware compatible with the one or more attributes associated with the machine-learning task. Additionally, act 604b can involve determining the cloud-based computing device from a plurality of available cloud-based computing devices corresponding to a plurality of cloud-based computing systems.

The series of acts 600 also includes an act 606 of instantiating the selected machine-learning model. For example, act 606 involves instantiating the selected machine-learning model at the cloud-based computing device in connection with a dataset indicated by the client device. Act 606 can involve running the machine-learning model at the cloud-based computing device at the on-demand cluster.

In one or more embodiments, the series of acts 600 also includes learning parameters of the selected machine-learning model at the cloud-based computing device utilizing the selected dataset. For example, the series of acts 600 can include converting the selected dataset to an intermediate representation of data in the selected dataset. The series of acts 600 can include providing, for display at the client device, a dataset annotation interface comprising tools to annotate data samples in the selected dataset. Specifically, the series of acts 600 can include receiving, from the client device, annotations for the data samples of the selected dataset. Additionally, the series of acts 600 can include converting the annotated data samples in the selected dataset from an initial representation to the intermediate representation. The series of acts 600 can then include learning parameters of the selected machine-learning model utilizing the intermediate representation of the data in the selected dataset.

According to one or more embodiments, the series of acts 600 includes integrating a command-line interface provided by an additional client device. The series of acts 600 can include receiving, from the client device via the command-line interface, one or more commands for learning the parameters of the selected machine-learning model. Additionally, the series of acts 600 can include storing the selected machine-learning model in a database comprising the plurality of available machine-learning models.

Additionally, the series of acts 600 includes an act 608 of generating a dataset visualization with interactive data for the dataset. For example, act 608 involves generating, for display at the client device, a dataset visualization comprising interactive data for the dataset by processing the dataset utilizing the selected machine-learning model. In one or more embodiments, the interactive data comprises interactive classification data for the dataset based on classifications of the selected machine-learning model.

FIG. 6 illustrates that act 608 includes a further act 608*a* of generating classifications for the dataset using the selected machine-learning model. For example, act 608*a* can involve generating classifications utilizing the selected machine-learning model by determining classifications for the data samples based on the annotations of the data samples.

Act 608 also includes a further act 608*b* of generating an interactive confusion matrix based on the classifications. For example, act 608*b* can involve generating a confusion matrix based on the classifications of the selected machine-learning model. For instance, act 608 can involve generating a confusion matrix by processing the dataset utilizing the selected machine-learning model, the selected machine-learning model comprising a natural language understanding model.

Act 608*b* can then involve providing, to the client device, the classifications of the data samples within the dataset visualization. For instance, act 608*b* can involve providing, for display at the client device, an interactive graphical matrix comprising a plurality of cells mapped to the classifications. For example, act 608*b* can involve providing the interactive graphical matrix by generating a plurality of mappings between the plurality of cells and the plurality of classifications. More specifically, act 608*b* can involve mapping a plurality of cells in the confusion matrix to data samples from the dataset and providing, for display at the client device, an interactive graphical matrix comprising the plurality of cells. Additionally, act 608*b* can involve providing, for display at the client device, one or more data samples from the dataset comprising a classification of the selected machine-learning model in response to an interaction with a cell of the plurality of cells.

In one or more embodiments, the series of acts 600 includes receiving, from the client device, a modified data sample based on the classifications of the data samples. The series of acts 600 can also include updating the parameters of the selected machine-learning model based on the modified data sample.

The series of acts 600 can also include receiving, from the client device, a request to download the selected machine-learning model comprising learned parameters. Additionally, the series of acts 600 can include providing to the client device for download the selected machine-learning model comprising the learned parameters.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
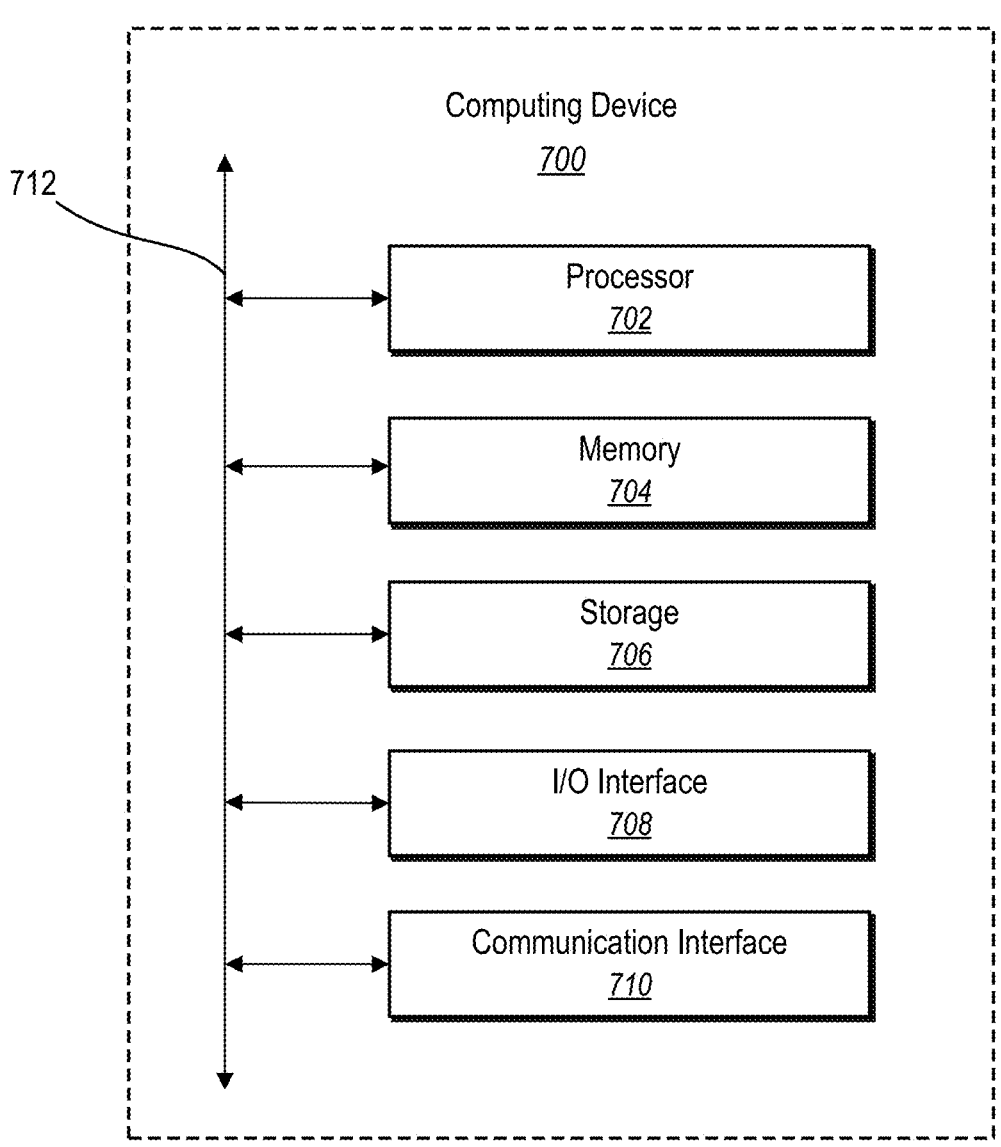
FIG. 7 illustrates a block diagram of an exemplary computing device in accordance with one or more embodiments.

FIG. 7 illustrates a block diagram of exemplary computing device 700 that may be configured to perform one or more of the processes described above. One will appreciate that one or more computing devices such as the computing device 700 may implement the system(s) of FIG. 1. As shown by FIG. 7, the computing device 700 can comprise a processor 702, a memory 704, a storage device 706, an I/O interface 708, and a communication interface 710, which may be communicatively coupled by way of a communication infrastructure 712. In certain embodiments, the computing device 700 can include fewer or more components than those shown in FIG. 7. Components of the computing device 700 shown in FIG. 7 will now be described in additional detail.

In one or more embodiments, the processor 702 includes hardware for executing instructions, such as those making up a computer program. As an example, and not by way of limitation, to execute instructions for dynamically modifying workflows, the processor 702 may retrieve (or fetch) the instructions from an internal register, an internal cache, the memory 704, or the storage device 706 and decode and execute them. The memory 704 may be a volatile or non-volatile memory used for storing data, metadata, and programs for execution by the processor(s). The storage device 706 includes storage, such as a hard disk, flash disk drive, or other digital storage device, for storing data or instructions for performing the methods described herein.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example, and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 710 may facilitate communications with various types of wired or wireless networks. The communication interface 710 may also facilitate communications using various communication protocols. The communication infrastructure 712 may also include hardware, software, or both that couples components of the computing device 700 to each other. For example, the communication interface 710 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:

receive, from a client device, a selection of a dataset and a selection of a machine-learning model from a plurality of available machine-learning models associated with a natural language understanding task;

receive, from a client device, a request to instantiate the selected machine-learning model utilizing the selected dataset;

monitor on-demand instances of cloud-based computing devices by utilizing a scheduler comprising computing software comprising software components on one or more computing devices to determine an availability status of the cloud-based computing devices;

determine, within a task attribute interface of a graphical user interface of the client device, a computing hardware configuration in response to one or more client device interactions with computing hardware configuration elements of the task attribute interface;

determine, by utilizing the scheduler to automatically determine availability statuses of cloud-based computing devices, a cloud-based computing device corresponding to a cloud-based storage system based on the selected machine-learning model and one or more attributes associated with the natural language understanding task by selecting, from the on-demand instances of the cloud-based computing devices, an available cloud-based computing device that comprises computing hardware compatible with the one or more attributes associated with the natural language understanding task, the availability status, and the computing hardware configuration;

instantiate the selected machine-learning model at the available cloud-based computing device;

learn parameters of the selected machine-learning model at the cloud-based computing device utilizing the selected dataset;

generate, for display within a graphical user interface of the client device, an interactive dataset visualization comprising a confusion matrix with a plurality of interactive cells mapped to classification data generated by the selected machine-learning model for the selected dataset in connection with the natural language understanding task;

generate, for display and based on a client device interaction with a data sample mapped to an interactive cell from the plurality of interactive cells within the interactive dataset visualization, a modification interface including an initial representation of classification data corresponding to the data sample and user interface tools for modifying classification data of the data sample;

modify the classification data of the data sample mapped to the interactive cell in response to a client device interaction with the user interface tools of the modification interface;

generate, for display within the modification interface, an updated initial representation of modified classification data corresponding to the data sample; and generate, for display within the graphical user interface of the client device, a modified interactive dataset visualization comprising a modified confusion matrix with a plurality of interactive cells mapped to the modified classification data.

2. The non-transitory computer readable storage medium as recited in claim 1, wherein learning parameters of the selected machine-learning model further comprises instructions that, when executed by at least one processor, cause the computing device to:

access, for the cloud-based computing device, data associated with the select machine-learning model and a training algorithm;

access, according to instantiation data, the dataset; and utilize the dataset and the training algorithm within the cloud-based computing device to learn parameters of the selected machine-learning model.

3. The non-transitory computer readable storage medium as recited in claim 1, further comprising instructions that, when executed by at least one processor, cause the computing device to determine the cloud-based computing device from a plurality of available cloud-based computing devices corresponding to a plurality of cloud-based computing systems.

4. The non-transitory computer readable storage medium as recited in claim 1, further comprising instructions that, when executed by at least one processor, cause the computing device to generate, for display at the client device, the interactive dataset visualization by generating classifications for natural language samples in the selected dataset utilizing the selected machine-learning model instantiated at the cloud-based computing device.

5. The non-transitory computer readable storage medium as recited in claim 1, further comprising instructions that, when executed by at least one processor, cause the computing device to provide the modification interface by presenting user interface tools comprising a text modification tool and an intent modification tool for modifying classification data of the data sample.

6. The non-transitory computer readable storage medium as recited in claim 5, further comprising instructions that, when executed by at least one processor, cause the computing device to:

provide, within the interactive dataset visualization, one or more labels or text associated with an interactive cell within the plurality of interactive cells within the confusion matrix and an intent associated with the interactive cell within the plurality of interactive cells within the confusion matrix;

modify the classification data of the data sample mapped to the interactive cell by modifying the one or more labels or text associated with the interactive cell in response to a client device interaction with the text modification tool;

modify the classification data of the data sample mapped to the interactive cell by modifying the intent associated with the interactive cell in response to a client device interaction with the intent modification tool; and generate the modified interactive dataset visualization based on the modified interactive cell.

7. The non-transitory computer readable storage medium as recited in claim 6, wherein providing the one or more labels or text further comprises instructions that, when executed by at least one processor, cause the computing device to:

determine, for the interactive cell, the intent from metadata associated with selected dataset; and provide the intent for display within the interactive dataset visualization.

8. The non-transitory computer readable storage medium as recited in claim 1, further comprising instructions that, when executed by at least one processor, cause the computing device to:

provide, for display at the client device, a dataset annotation interface comprising tools to annotate data samples in the selected dataset in response to one or more client device interactions with the interactive dataset visualization;

convert the annotated data samples in the selected dataset from an initial representation to an intermediate representation of data in the selected dataset representing the annotated data samples; and learn parameters of the selected machine-learning model utilizing the intermediate representation of the data in the selected dataset.

9. The non-transitory computer readable storage medium as recited in claim 1, further comprising instructions that, when executed by at least one processor, cause the computing device to:

integrate a command-line interface provided by an additional client device;

receive, from the client device via the command-line interface, one or more commands for learning the parameters of the selected machine-learning model; and store the selected machine-learning model in a database comprising the plurality of available machine-learning models.

10. A system comprising:

one or more computer memory devices; and one or more computing devices configured to cause the system to:

receive, from a client device, a request to instantiate a selected machine-learning model from a plurality of available machine-learning models and one or more attributes associated with a natural language understanding task;

monitor on-demand instances of cloud-based computing devices by utilizing a scheduler comprising computing software comprising software components on one or more computing devices to determine an availability status of the cloud-based computing devices;

determine, within a task attribute interface of a graphical user interface of the client device, a computing hardware configuration in response to one or more client device interactions with computing hardware configuration elements of the task attribute interface;

determine, for the selected machine-learning model, a cloud-based computing device corresponding to a cloud-based system by:

monitoring, by utilizing a scheduler, a status of an on-demand cluster of cloud-based computing devices comprising the cloud-based computing device;

determining automatically that the cloud-based computing device is available and comprises computing hardware compatible with the one or more attributes associated with the natural language understanding task; and selecting, from the on-demand instances of the cloud-based computing devices, an available cloud-based computing device that comprises computing hardware compatible with the one or more attributes associated with the natural language understanding task, the availability status, and the computing hardware configuration;

instantiate the selected machine-learning model at the available cloud-based computing device in connection with a dataset indicated by the client device;

generate, for display within a graphical user interface at the client device, an interactive dataset visualization comprising a confusion matrix with a plurality of interactive cells mapped to classification data generated by the selected machine-learning model for the dataset in connection with the natural language understanding task;

generate, for display and based on a client device interaction with a data sample mapped to an interactive cell from the plurality of interactive cells within the interactive dataset visualization, a modification interface including an initial representation of classification data corresponding to the data sample and user interface tools for modifying classification data of the data sample;

modify the classification data of the data sample mapped to the interactive cell in response to a client device interaction with the user interface tools of the modification interface;

generate, for display within the modification interface, an updated initial representation of modified classification data corresponding to the data sample; and generate, for display within the graphical user interface of the client device, a modified interactive dataset visualization comprising a modified confusion matrix with a plurality of interactive cells mapped to the modified classification data.

11. The system as recited in claim 10, wherein the one or more computing devices are further configured to cause the system to:

receive, from the client device, an indication of the one or more attributes of the natural language understanding task comprising a computing hardware configuration; and determine automatically that the cloud-based computing device comprises computing hardware corresponding to the computing hardware configuration received from the client device.

12. The system as recited in claim 10, wherein the one or more computing devices are further configured to cause the system to generate the interactive dataset visualization by:

generate the confusion matrix by processing the dataset utilizing the selected machine-learning model, the selected machine-learning model comprising a natural language understanding model;

map a plurality of interactive cells in the confusion matrix to data samples from the dataset based on classifications determined by the natural language understanding model; and provide, for display at the client device, an interactive graphical matrix comprising the confusion matrix with the plurality of interactive cells.

13. The system as recited in claim 10, wherein the one or more computing devices are further configured to cause the system to:

convert, in response to detecting one or more modifications to the classification data mapped to the plurality of interactive cells, data samples of the dataset to an intermediate representation of the data samples representing the modified interactive classification data; and learn parameters of the selected machine-learning model utilizing the intermediate representation of the data samples.

14. The system as recited in claim 13, wherein the one or more computing devices are further configured to cause the system to:

receive, from the client device, annotations for the data samples of the dataset;

generate the classification data utilizing the selected machine-learning model by determining classifications for the data samples based on the annotations of the data samples; and provide, to the client device, the classifications of the data samples within the confusion matrix of the interactive dataset visualization.

15. The system as recited in claim 14, wherein the one or more computing devices are further configured to cause the system to:

receive, from the client device, a modified data sample comprising a modified natural language label based on the classifications of the data samples; and update the parameters of the selected machine-learning model based on the modified data sample.

16. The system as recited in claim 10, wherein the one or more computing devices are further configured to cause the system to:

receive, from the client device, a request to download the selected machine-learning model comprising learned parameters; and provide to the client device for download the selected machine-learning model comprising the learned parameters.

17. A method comprising:

receiving, from a client device, a request to instantiate a selected machine-learning model from a plurality of available machine-learning models and one or more attributes associated with a natural language understanding task;

monitoring on-demand instances of cloud-based computing devices by utilizing a scheduler comprising computing software comprising software components on one or more computing devices to determine an availability status of the cloud-based computing devices;

determining, within a task attribute interface of a graphical user interface of the client device, a computing hardware configuration in response to one or more client device interactions with computing hardware configuration elements of the task attribute interface;

determining, by utilizing the scheduler to automatically determine availability statuses of cloud-based computing devices for the selected machine-learning model, a cloud-based computing device corresponding to a cloud-based storage system based on the selected machine-learning model and one or more attributes associated with the natural language understanding task by selecting, from the on-demand instances of the cloud-based computing devices, an available cloud-based computing device that comprises computing hardware compatible with the one or more attributes associated with the natural language understanding task, the availability status, and the computing hardware configuration;

instantiating the selected machine-learning model at the available cloud-based computing device in connection with a dataset indicated by the client device; and generating an interactive dataset visualization comprising interactive-classification data for the dataset by:

generating a confusion matrix based on classifications determined by the selected machine-learning model;

providing, for display within a graphical user interface at the client device, an interactive graphical matrix comprising the confusion matrix with a plurality of interactive cells mapped to the classifications in connection with the natural language understanding task;

generating, for display and based on a client device interaction with a data sample mapped to an interactive cell from the plurality of interactive cells within the interactive dataset visualization, a modification interface including an initial representation of classification data corresponding to the data sample and user interface tools for modifying the classifications of the data sample;

modifying the classifications of the data sample mapped to the interactive cell in response to a client device interaction with the user interface tools of the modification interface;

generating, for display within the modification interface, an updated initial representation of modified classification data corresponding to the data sample; and generating, for display within the graphical user interface of the client device, a modified interactive dataset visualization comprising a modified confusion matrix with a plurality of interactive cells mapped to the modified classifications.

18. The method as recited in claim 17, further comprising determining the one or more attributes associated with the natural language understanding task by determining a default computing hardware configuration or a user-defined computing hardware configuration for the natural language understanding task.

19. The method as recited in claim 17, wherein determining the cloud-based computing device comprises:

monitoring, by utilizing the scheduler, a status of plurality of cloud-based computing devices;

determining automatically, by utilizing the scheduler, that the cloud-based computing device comprises a status indicating availability of the plurality of cloud-based computing devices; and determining automatically, by utilizing the scheduler, that the cloud-based computing device comprises computing hardware compatible with a computing hardware configuration indicated in the request to instantiate a selected machine-learning model.

20. The method as recited in claim 17, further comprising:

determining a plurality of annotated data samples from the dataset;

generating a plurality of intermediate representations of the plurality of annotated data samples, in response to detecting one or more modifications to the classifications mapped to the plurality of interactive cells; and classifying, utilizing the selected machine-learning model, the plurality of annotated data samples based on the plurality of intermediate representations of the plurality of annotated data samples.

* * * * *